US012715231B2

(12) United States Patent
Matsumoto et al.

(10) Patent No.: US 12,715,231 B2
(45) Date of Patent: Aug. 25, 2026

(54) PRINTING APPARATUS AND CONTROL METHOD

(71) Applicant: CANON KABUSHIKI KAISHA, Tokyo (JP)

(72) Inventors: Yasunori Matsumoto, Kanagawa (JP); Masaaki Matsuura, Kanagawa (JP); Noriyuki Sugiyama, Kanagawa (JP); Motoyuki Taguchi, Tokyo (JP); Junichi Kubokawa, Nagasaki (JP); Yumi Suzuki, Tokyo (JP); Takahiro Kiuchi, Tokyo (JP); Kyosuke Kamishima, Kanagawa (JP); Haruo Uchida, Kanagawa (JP); Keisei Hakamata, Kanagawa (JP); Takaaki Ishida, Kanagawa (JP); Shoichi Kan, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/753,074

(22) Filed: Jun. 25, 2024

(65) Prior Publication Data

US 2025/0001777 A1 Jan. 2, 2025

(30) Foreign Application Priority Data

Jun. 28, 2023 (JP) ................................ 2023-105837

(51) Int. Cl.
*B41J 13/00* (2006.01)
*B41J 2/01* (2006.01)
(Continued)

(52) U.S. Cl.
CPC ................ *B41J 17/14* (2013.01); *B41J 2/01* (2013.01); *B41J 3/60* (2013.01); *B41J 11/007* (2013.01);
(Continued)

(58) Field of Classification Search
CPC ....... B41J 17/14; B41J 2/01; B41J 3/60; B41J 11/007; B41J 13/0045
See application file for complete search history.

(56) References Cited

U.S. PATENT DOCUMENTS

2006/0279622 A1* 12/2006 Kao .......................... B41J 3/60 347/104
2016/0229205 A1* 8/2016 Taniguchi ............ B41J 13/0009
(Continued)

FOREIGN PATENT DOCUMENTS

JP 2020-015180 A 1/2020

*Primary Examiner* — Yaovi M Ameh
(74) *Attorney, Agent, or Firm* — Venable LLP

(57) ABSTRACT

A printing apparatus includes a printing unit performing printing by applying ink to a print medium conveyed in a first direction, a reversal conveyance path reversing the print medium conveyed in a second direction opposite to the first direction to guide the print medium to a position at which the ink can be applied by the printing unit, and a control unit performing printing on a first side and an opposite second side of a first print medium and a subsequent second print medium, and in starting printing on the first side in accordance with the amount of the ink applied to a region that the second print medium being conveyed in the first direction contacts of the first print medium conveyed through the reversal conveyance path after the first side is printed, the control unit keeps the second print medium on standby for a predetermined time at a predetermined position.

12 Claims, 15 Drawing Sheets

(51) Int. Cl.

| | |
|---|---|
| ***B41J 3/60*** | (2006.01) |
| ***B41J 11/00*** | (2006.01) |
| ***B41J 17/14*** | (2006.01) |
| ***B41J 17/40*** | (2006.01) |
| ***B41J 29/393*** | (2006.01) |

(52) U.S. Cl.

CPC ......... *B41J 13/0045* (2013.01); *B41J 29/393* (2013.01)

(56) References Cited

U.S. PATENT DOCUMENTS

| | | | | |
|---|---|---|---|---|
| 2018/0272755 | A1* | 9/2018 | Komuro | B65H 5/24 |
| 2023/0294426 | A1 | 9/2023 | Sugiyama et al. | |
| 2023/0339244 | A1 | 10/2023 | Kubokawa et al. | |

* cited by examiner

PRINTING APPARATUS AND CONTROL METHOD

BACKGROUND OF THE INVENTION

Field of the Invention

The present invention relates to a printing apparatus and a control method.

Description of the Related Art

Japanese Patent Laid-Open No. 2020-015180 discloses a technique to execute, in a printing apparatus capable of performing printing on both sides of a print medium, the operation of conveying a fed print medium to a conveyance path for printing on a print medium and the operation of retracting the print medium after printing on a front surface into a conveyance path for reversal, in parallel.

However, in the technique disclosed in Japanese Patent Laid-Open No. 2020-015180, in the conveyance paths, there is a region where the printing surface of the print medium being retracted contacts the print medium being conveyed and where these two print media move in opposite directions to each other. Thus, there is a probability that print quality on the surface of the print medium being retracted may deteriorate or that ink may be transferred to the print medium being conveyed, resulting in deterioration in product quality.

SUMMARY OF THE INVENTION

The present invention is made in view of the above problem and provides a technique capable of suppressing deterioration in product quality.

A printing apparatus is equipped with; in accordance with one aspect of the present invention includes:

a feeding unit configured to feed a print medium to a first position; a conveyance unit capable of conveying, in a first direction, the print medium fed to the first position by the feeding unit;

a printing unit configured to perform printing by applying ink to the print medium conveyed in the first direction by the conveyance unit;

a reversal conveyance path configured to reverse the print medium conveyed in a second direction opposite to the first direction by the conveyance unit after printing using the printing unit to guide the print medium to a position to which the ink can be applied by the printing unit; and a control unit configured to control the conveyance unit and the printing unit to execute printing on a first side and a second side opposite to the first side [in] of a first print medium and a second print medium subsequent to the first print medium, wherein in a case of starting printing on the first side of the second print medium in accordance with an application amount of the ink applied to a region that the second print medium being conveyed in the first direction contacts [in] of the first print medium conveyed through the reversal conveyance path and having the first side that has been printed, the control unit keeps the second print medium on standby for a predetermined time in the first position.

According to the present invention, it is possible to suppress deterioration in product quality.

Further features of the present invention will become apparent from the following description of exemplary embodiments with reference to the attached drawings.

DESCRIPTION OF THE EMBODIMENTS

An example of embodiments of a printing apparatus and a control method will be described below with reference to the accompanying drawings. It should be noted that the following embodiments are not intended to limit the present invention, and not all combinations of features described in the present embodiments are necessarily essential to a solution to the problem to be solved by the present invention. Further, the positions, shapes, and the like of components described in the embodiments are merely examples, and the present invention is not intended to be limited thereto.

Schematic Configuration of the Printing Apparatus

The printing apparatus according to the present embodiment is a serial-scan type inkjet printing apparatus that performs printing by ejecting ink onto a conveyed print medium (hereinafter referred to as "sheet" as appropriate) while moving a print head in a sheet width direction intersecting a conveyance direction. It should be noted that the printing apparatus to which the present invention is applicable is not limited to one having only a printing function.

The present invention can also be applied to a multifunction peripheral having the function of scanning a document, a FAX function, and the like.

Figure 1:
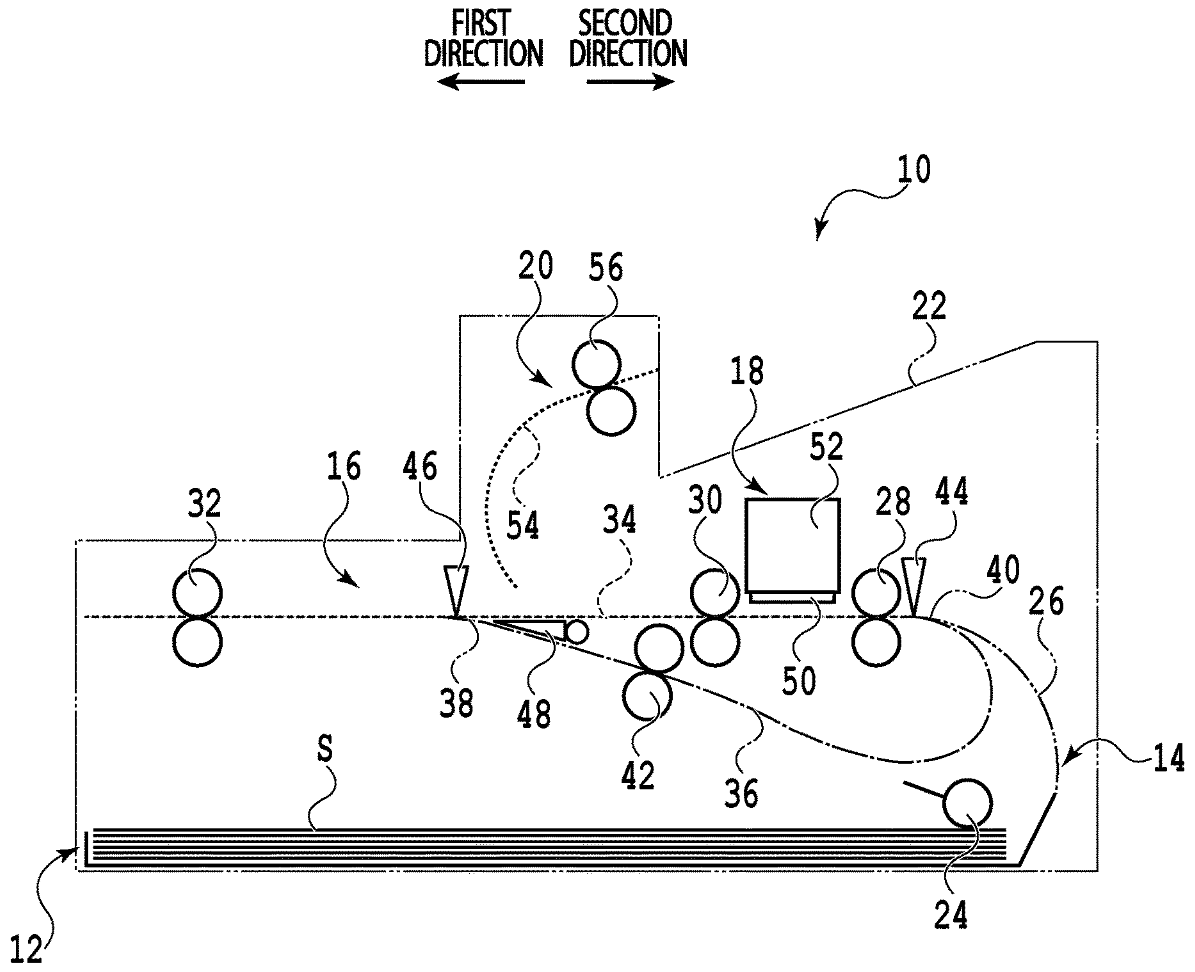
FIG. 1 is a schematic configuration diagram of a printing apparatus.

FIG. 1 is a schematic configuration diagram of a printing apparatus 10 in the present embodiment. Incidentally, FIG. 1 and the subsequent figures show paths through which sheets are conveyed using different types of lines to facilitate understanding. The printing apparatus 10 includes a storage portion 12 that stores a sheet S, a feeding portion 14 that feeds the sheet S stored in the storage portion 12 to a conveyance portion 16 (described later), and the conveyance portion 16 that conveys the sheet S fed by the feeding portion 14. The printing apparatus 10 also includes a printing portion 18 that performs printing on the sheet S conveyed by the conveyance portion 16, a discharging portion 20 capable of discharging the sheet S after printing, and a stacking portion 22 that can be stacked with the discharged sheet S. The printing apparatus 10 further includes a control portion 200 (see FIG. 2) that controls the overall operation of the printing apparatus 10.

Storage Portion 12 and Feeding Portion 14

More specifically, the storage portion 12 is provided so as to be insertable into and removable from the printing apparatus 10, and a plurality of sheets S are stacked and stored inside the storage portion 12. The feeding portion 14 includes a feeding roller 24 that picks up the uppermost sheet S of the sheets S stacked on the storage portion 12, and a feeding path 26 that guides the sheet S picked up by the feeding roller 24 to the conveyance portion 16. The feeding roller 24 is driven by the driving force of a first conveyance motor 226 (see FIG. 2). Incidentally, the feeding path 26 of the feeding portion 14 may be provided with a roller pair that assists in feeding the sheet S.

Conveyance Portion 16

The conveyance portion 16 includes a main conveyance roller pair 28 that conveys the fed sheet S to the printing portion 18, and a sub-conveyance roller pair 30 that conveys the sheet S printed by the printing portion 18. The conveyance portion 16 also includes, on the downstream side of the sub-conveyance roller pair 30 in a first direction which is a conveyance direction in which the sheet S is conveyed by the main conveyance roller pair 28 and the sub-conveyance roller pair 30, a reversal roller pair 32 that can convey the sheet S in the first direction and a second direction opposite to the first direction. The main conveyance roller pair 28, the sub-conveyance roller pair 30, and the reversal roller pair 32 are capable of conveying the sheet S in the first conveyance path 34.

Figure 2:
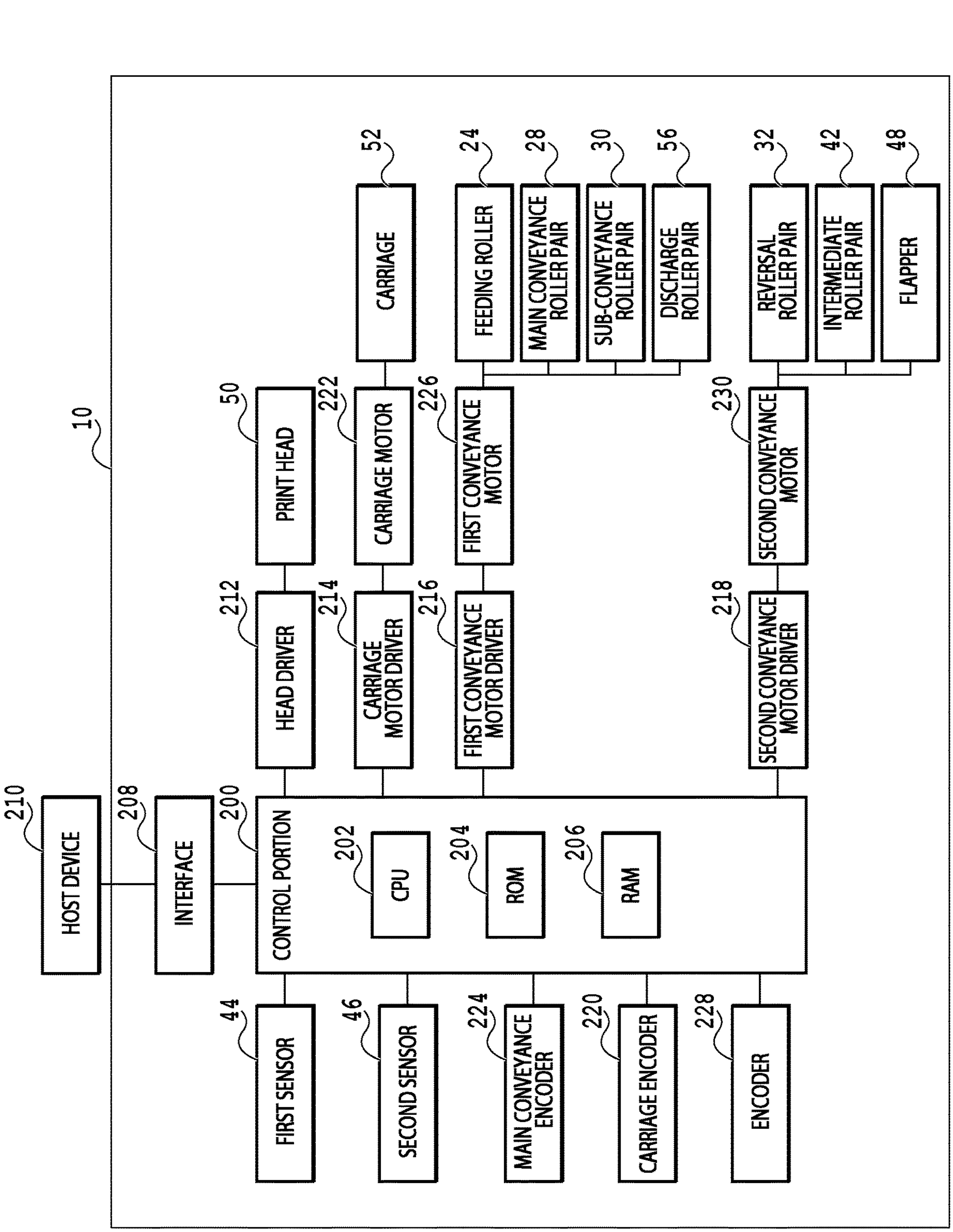
FIG. 2 is a block diagram showing a configuration of a control system of the printing apparatus.

The main conveyance roller pair 28 and the sub-conveyance roller pair 30 are synchronously driven by a first conveyance motor 226 and controlled to be driven according to positional and speed information acquired based on a signal from a main conveyance encoder 224 (see FIG. 2). Further, the reversal roller pair 32 is driven by a second conveyance motor 230 (see FIG. 2) different from the first conveyance motor 226. In a case where double-sided printing is performed on the sheet S, the reversal roller pair 32 reverses the direction of rotation after drawing the sheet S in which printing on one side has ended into the reversal roller pair 32, thereby reversing the conveyance direction of the sheet S.

The conveyance portion 16 includes a second conveyance path (hereinafter also referred to as "reversal conveyance path") 36 provided below the first conveyance path 34. The second conveyance path 36 has one end connected between the sub-conveyance roller pair 30 and the reversal roller pair 32 in the first conveyance path 34 and the other end connected to a connection portion between the first conveyance path 34 and the feeding path 26. Incidentally, in the following description, a portion where the one end of the second conveyance path 36 is connected to the first conveyance path 34 will be referred to as first junction 38, and a portion where the other end of the second conveyance path 36 is connected to a connection portion between the first conveyance path 34 and the feeding path 26 will be referred to as second junction 40.

The conveyance portion 16 includes an intermediate roller pair 42 capable of conveying the sheet S in the second direction in the second conveyance path 36. It should be noted that the intermediate roller pair 42 and the reversal roller pair 32 are driven by the second conveyance motor 230. The second conveyance path 36 may be provided with a plurality of intermediate roller pairs 42. The conveyance portion 16 also includes a first sensor 44 capable of detecting an end of the sheet S between the main conveyance roller pair 28 and the feeding path 26, and a second sensor 46 capable of detecting the end of the sheet S near the first junction 38 and on the downstream side of the first junction 38 in the first direction.

Both the first sensor 44 and the second sensor 46 have the same configuration and are detection means using, for example, a photo interrupter and a shielding lever. In the present embodiment, the first sensor 44 and the second sensor 46 detect the end of the conveyed (fed) sheet S in the first direction (second direction). Based on the results of detection made by the first sensor 44 and the second sensor 46, errors such as a jam are determined, the position of the sheet S is specified, and the like.

The conveyance portion 16 includes a flapper 48 rotatably provided in the vicinity of the first junction 38 and upstream of the first junction 38 in the first direction. The flapper 48 is displaceable between a first position (the state shown in FIG. 1) where the printed sheet S can be conveyed along the first conveyance path 34 and a second position (the state shown in FIG. 3A) where the printed sheet S can be guided to an exit path 54 (described later) of the discharging portion 20. It should be noted that in the case of being in the second position, the flapper 48 opens one end of the second conveyance path 36 at the first junction 38, and in the case of being in the first position, the flapper 48 partially blocks the opening. In other words, even in a case where the sheet S is conveyed in the second direction in the second conveyance path 36 with the flapper 48 being in the first position and a portion remaining in the first conveyance path 34, the conveyance of the sheet S in the second direction is not restricted by the flapper 48. Further, in a case where the flapper 48 is in the second position, the sheet S conveyed in the second direction by the reversal roller pair 32 is guided to the second conveyance path 36 by the flapper 48.

For the rotation mechanism of the flapper 48, various publicly known configurations can be used. In addition, although a position where the flapper 48 is rotated from the first position to guide the printed sheet S to the discharging portion 20 and a position where the sheet S conveyed in the second direction by the reversal roller pair 32 is guided to the second conveyance path 36 are the same second position, the two positions may be different.

Printing Portion 18 and Discharging Portion 20

The printing portion 18 includes a print head 50 that performs printing on the sheet S conveyed by the main conveyance roller pair 28 and the sub-conveyance roller pair 30, and a carriage 52 capable of moving the print head 50 in a direction intersecting the first direction. The carriage 52 is configured to be reciprocable in a direction intersecting the first direction, for example, in the width direction of the sheet S being conveyed, by a carriage motor 222 (see FIG. 2). The position, moving direction, and moving speed of the carriage 52 are controlled based on a signal from a carriage encoder 220 (see FIG. 2).

The print head 50 is mounted on the carriage 52, includes an ink ejection portion (not shown) formed of a plurality of nozzles, and performs printing on the sheet S in conjunction with the conveyance of the sheet S. Specifically, a printing operation is performed in which ink is ejected from the print head 50 onto the sheet S conveyed to a print start position by the conveyance portion 16 while moving the print head 50 in the width direction. Next, a conveyance operation of conveying the sheet S by a predetermined amount is performed, and then the printing operation is executed again. As described above, the printing apparatus 10 performs printing on the sheet S by alternately and repeatedly executing the printing operation and the conveyance operation.

The discharging portion 20 includes the exit path 54 that guides the printed sheet S conveyed via the flapper 48 to the stacking portion 22, and a discharge roller pair 56 that discharges the sheet S to the stacking portion 22 in the exit path 54. In the present embodiment, face-down discharge in which the sheet S is discharged with a printing surface facing downward is made in performing single-sided printing in which printing is performed only on one side of the sheet S. However, face-up discharge in which the sheet S is discharged with the printing surface facing upward may also be made.

Control Configuration of the Printing Apparatus 10

Next, the configuration of the control system of the printing apparatus 10 will be described. FIG. 2 is a block diagram showing the configuration of the control system of the printing apparatus 10. A control portion 200 that controls the overall operation of the printing apparatus 10 includes a CPU 202, a ROM 204, and a RAM 206. The CPU 202 performs control of the operation of each component in the printing apparatus 10 and processing of input image data based on various programs. The ROM 204 functions as a memory that stores processing programs for various kinds of control executed by the CPU 202 and image data. The RAM 206 is used as a storage region and a work area for saving various kinds of data used to control the printing apparatus 10.

The control portion 200 is connected to an interface 208 and receives the input of various pieces of information including a print instruction (job) output from an external device such as a host device 210 via the interface 208. As the external device, various publicly known devices such as a general-purpose personal computer and a mobile terminal can be used.

The control portion 200 is connected to a head driver 212, a carriage motor driver 214, a first conveyance motor driver 216, and a second conveyance motor driver 218. The head driver 212 drives a print element provided in the print head 50 based on a print signal output from the control portion 200 to eject ink. The carriage motor driver 214 drives the carriage motor 222 based on a control signal output from the control portion 200 in response to a signal from the carriage encoder 220.

The first conveyance motor driver 216 drives the first conveyance motor 226 based on a control signal output from the control portion 200 in response to a signal from the main conveyance encoder 224, the first sensor 44, the second sensor 46, and the like. It should be noted that the main conveyance encoder 224 acquires information according to, for example, the rotation of the main conveyance roller pair 28. The first conveyance motor 226 drives the feeding roller 24, the main conveyance roller pair 28, the sub-conveyance roller pair 30, the discharge roller pair 56, and the like via a drive transmission mechanism (not shown). It should be noted that the feeding roller 24 may be driven with the cooperation of, for example, the first conveyance motor 226 and the carriage motor 222.

The second conveyance motor driver 218 drives the second conveyance motor 230 based on a control signal output from the control portion 200 in response to a signal from the encoder 228, the first sensor 44, the second sensor 46, and the like. It should be noted that the encoder 228 acquires information according to, for example, the rotation of the reversal roller pair 32. The second conveyance motor 230 drives the reversal roller pair 32, the intermediate roller pair 42, the flapper 48, and the like via the drive transmission mechanism (not shown).

Sheet Behavior During Printing

The printing apparatus 10 can perform printing in three printing modes. Specifically, the printing apparatus 10 can execute single-sided printing, first double-sided punting, and second double-sided printing. The single-sided printing is a printing mode in which printing is performed only on a first side which is one side of the sheet S. The first double-sided printing is a printing mode in which printing is performed on both the first side and a second side which is the other side of the sheet S and in which after the printing on both sides of the sheet S, punting is performed on the subsequent sheet S. The second double-sided printing is a printing mode in which printing is performed on both the first and second sides of the sheet S and in which during printing on both sides of the preceding sheet S, printing on the first side of the subsequent sheet S is executed.

A description will be given below of the behavior of the sheet S during the single-sided printing and second double-sided printing with reference to FIGS. 3A to 8C.

Sheet Behavior During the Single-Sided Printing

Figure 3A:
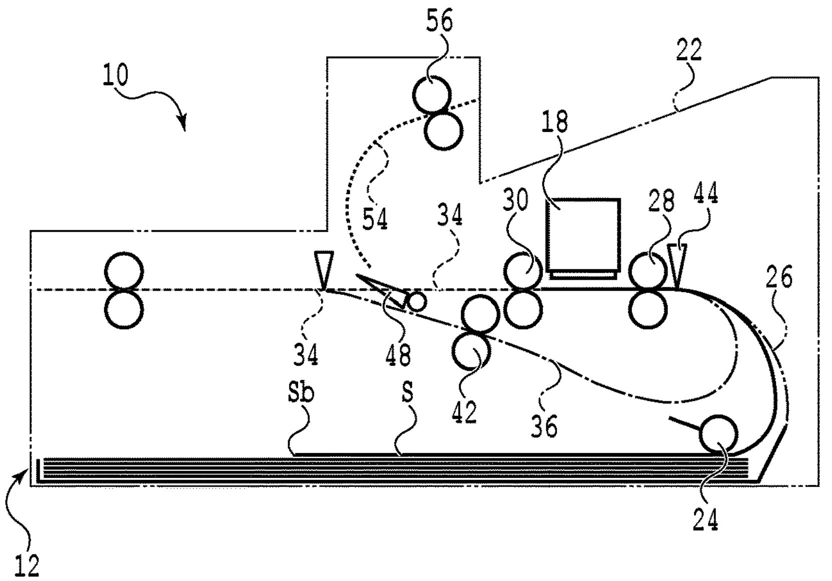
FIGS. 3A to 3C are diagrams showing the behavior of a sheet during single-sided printing.
Figure 3B:
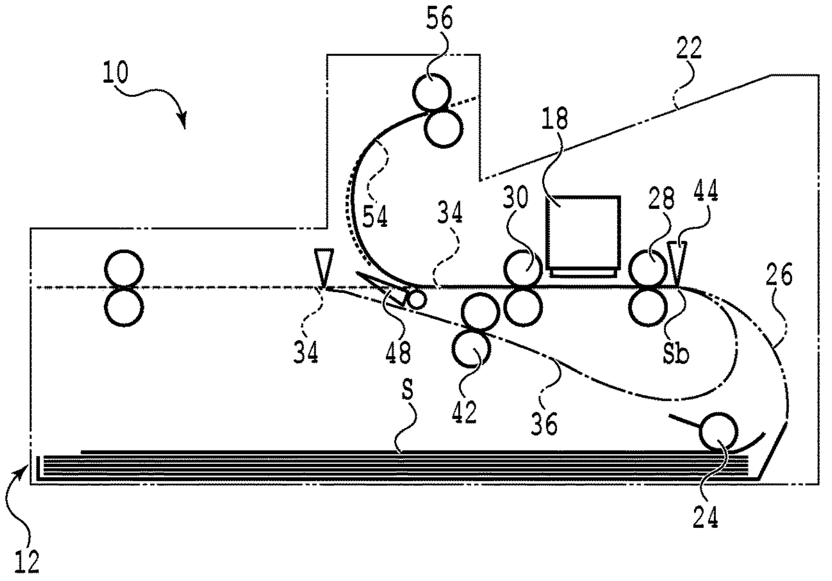
Figure 3C:
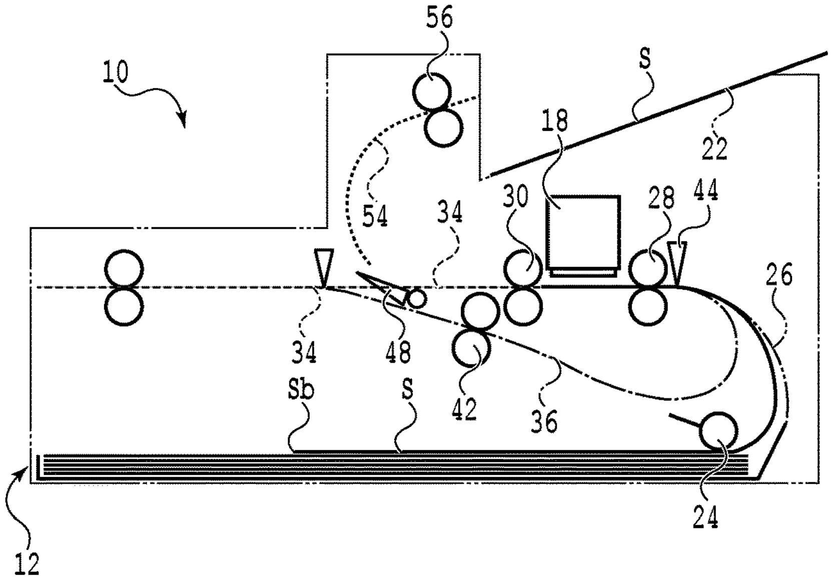

First, the behavior of the sheet S in the single-sided printing will be described. FIGS. 3A to 3C are diagrams showing the behavior of the sheet S during the single-sided printing.

In the single-sided printing, the sheet S stored in the storage portion 12 is fed by the feeding roller 24 via the feeding path 26 to the main conveyance roller pair 28, is then conveyed along the first conveyance path 34 by the main conveyance roller pair 28, and is printed on the first side by the printing portion 18 (see FIG. 3A). At this time, the flapper 48 is located in the second position.

Next, the sheet S conveyed by the main conveyance roller pair 28 and the sub-conveyance roller pair 30 is guided to the exit path 54 by the flapper 48 located in the second position. In a case where a rear end Sb of the sheet S being conveyed is detected by the first sensor 44, the feeding roller 24 is driven to feed the next sheet S from the storage portion 12 (see FIG. 3B).

After that, the sheet S on which printing has ended is discharged to the stacking portion 22 by the discharge roller pair 56 (see FIG. 3C), and similarly, printing is performed on the first side of the next fed sheet S and the sheet S is discharged to the stacking portion 22 via the exit path 54.

Sheet Behavior During the Second Double-Sided Printing

Next, the behavior of the sheet S in the second double-sided printing will be described. In the present embodiment, the behavior of the sheet S changes depending on the amount of ink applied to the sheet S during the second double-sided printing.

Case Where a Small Amount of Ink is Applied

First, the behavior of the sheet S in a case where the amount of ink applied to the sheet S is small (for example, less than a threshold value) will be described in detail below with reference to FIGS. 4A to 5C. FIGS. 4A to 5C are diagrams showing the behavior of the sheet S during the second double-sided printing in a case where the amount of ink applied to the sheet S is small. Incidentally, in FIGS. 4A to 5C, a portion of the constituents shown in FIG. 1 is omitted, and the first conveyance path 34 and the second conveyance path 36 are mainly shown to facilitate understanding.

The sheet S stored in the storage portion 12 is fed by the feeding roller 24 via the feeding path 26 to the main conveyance roller pair 28 and then is conveyed along the first conveyance path 34 by the main conveyance roller pair 28, and printing on the first side of the sheet S is performed by the printing portion 18. At this time, the flapper 48 is located in the first position, so that the sheet S after printing on the first side is conveyed toward the reversal roller pair 32 along the first conveyance path 34 (see FIG. 4A). It should be noted that, at this point in time, the reversal roller pair 32 rotates forward (rotates in an arrow A direction [see FIG. 4A]) and conveys the sheet S in the first direction by catching the sheet S in the reversal roller pair 32. At this time, the reversal roller pair 32 that rotates forward is driven simultaneously with the main conveyance roller pair 28 and the sub-conveyance roller pair 30.

Figure 4A:
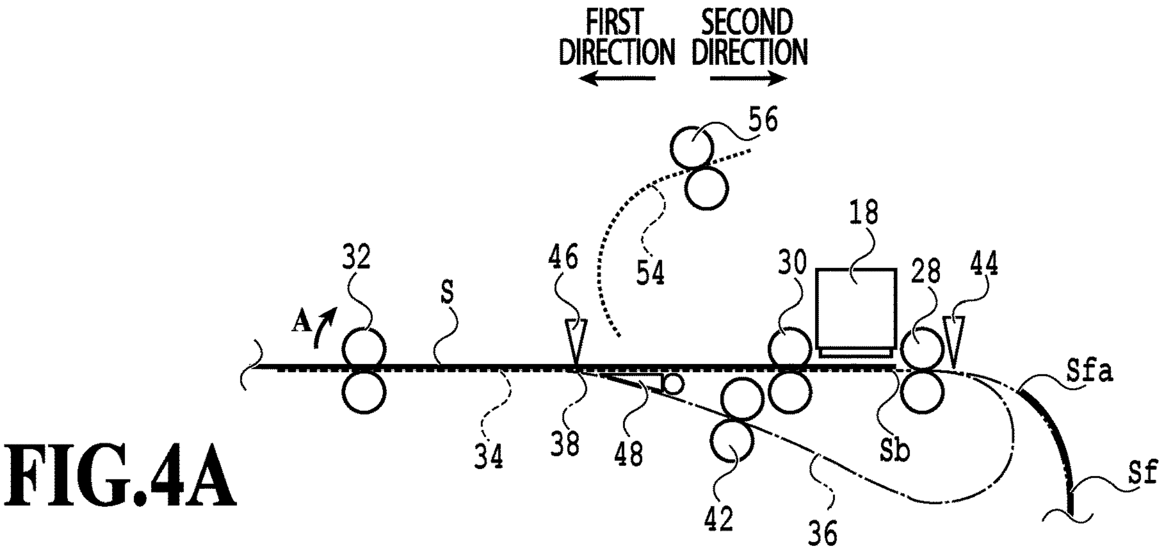
FIGS. 4A to 4C are diagrams showing the behavior of the sheet during second double-sided printing in a case where an ink application amount is small.

After that, the sheet S after printing on the first side is conveyed, and at the time of the sheet S being conveyed by a predetermined amount after the rear end Sb of the sheet S is detected by the first sensor 44, a subsequent sheet Sf on which printing is to be performed subsequent to the printing on the sheet S is fed from the storage portion 12 (see FIG. 4A). In a case where a leading end Sfa of the fed subsequent sheet Sf is detected by the first sensor 44, printing on the first side of the subsequent sheet Sf is started (see FIG. 4B).

Further, the sheet S after printing on the first side is conveyed in the first direction along the first conveyance path 34 by the reversal roller pair 32 and the like. In a case where the rear end Sb of the sheet S is then detected by the second sensor 46, the flapper 48 is moved from the first position to the second position (see FIG. 4B). The second sensor 46 is provided on the downstream side in the first direction near the flapper 48. As a result, the entire sheet S whose rear end Sb has been detected by the second sensor 46 is located downstream of the second sensor 46 in the first direction.

Figure 4B:
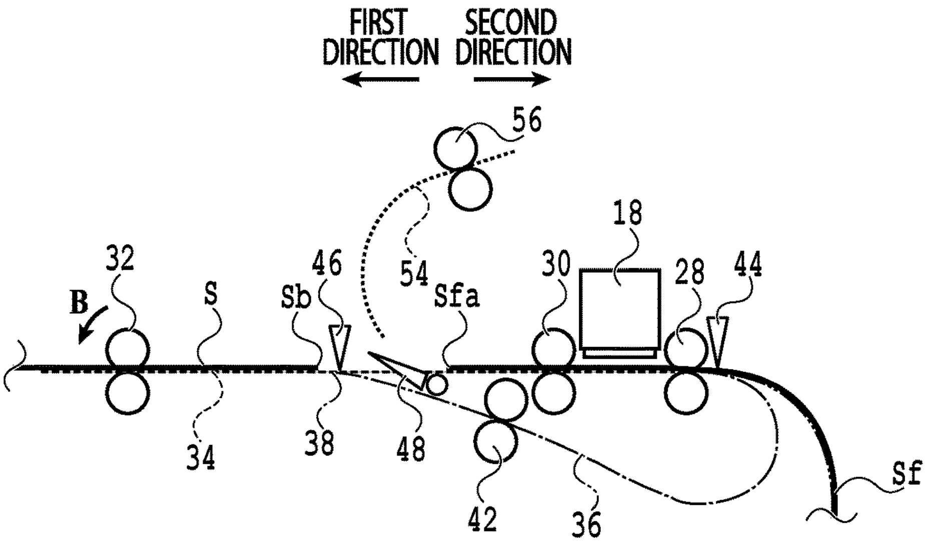
Figure 4C:
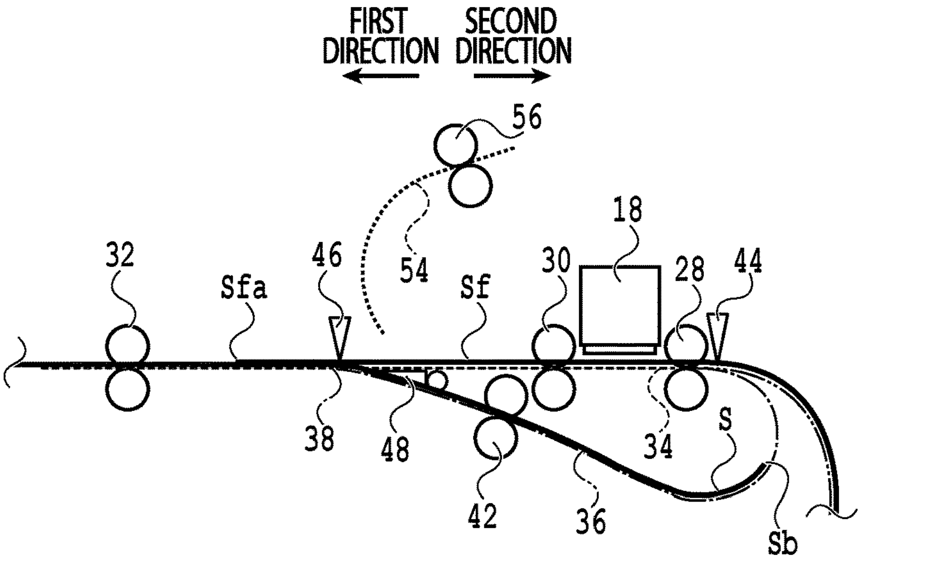
Figure 5A:
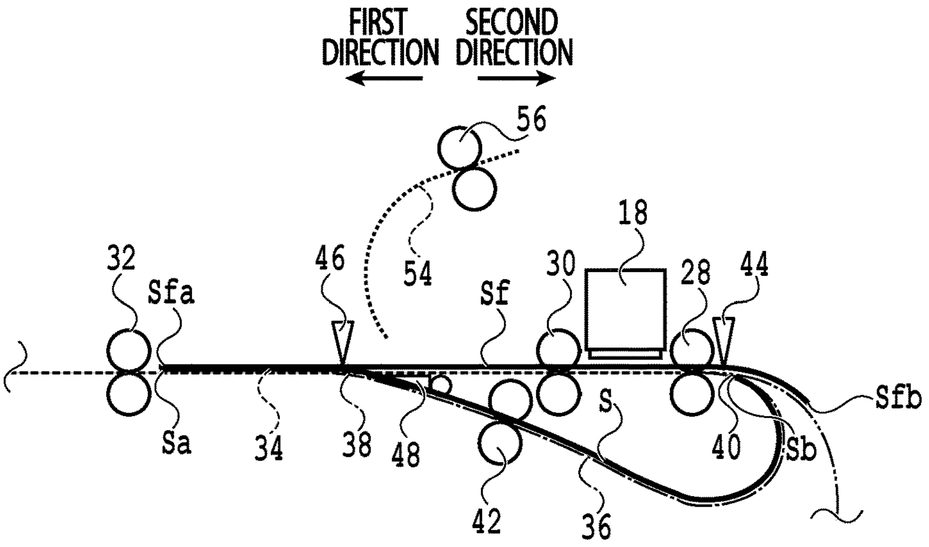
FIGS. 5A to 5C are diagrams showing the behavior of the sheet during the second double-sided printing in a case where the ink application amount is small.
Figure 5B:
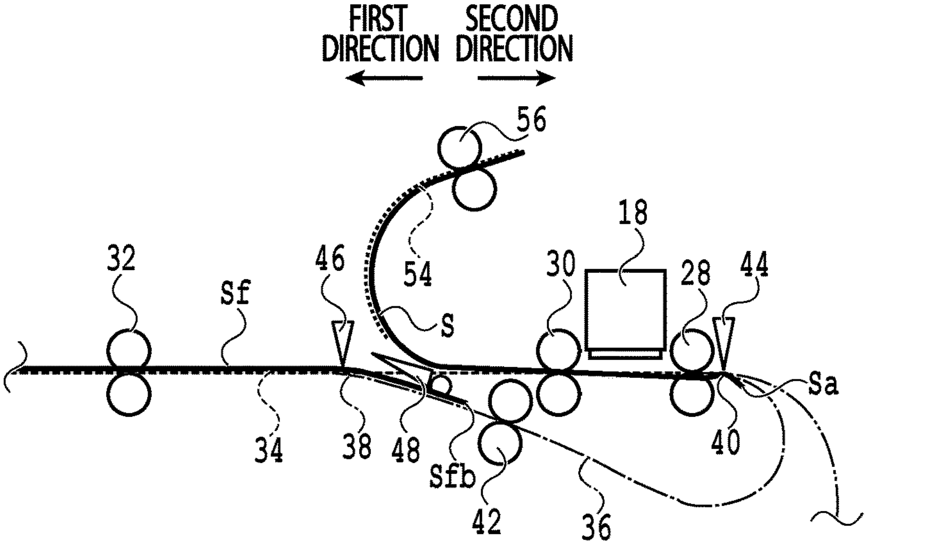
Figure 5C:
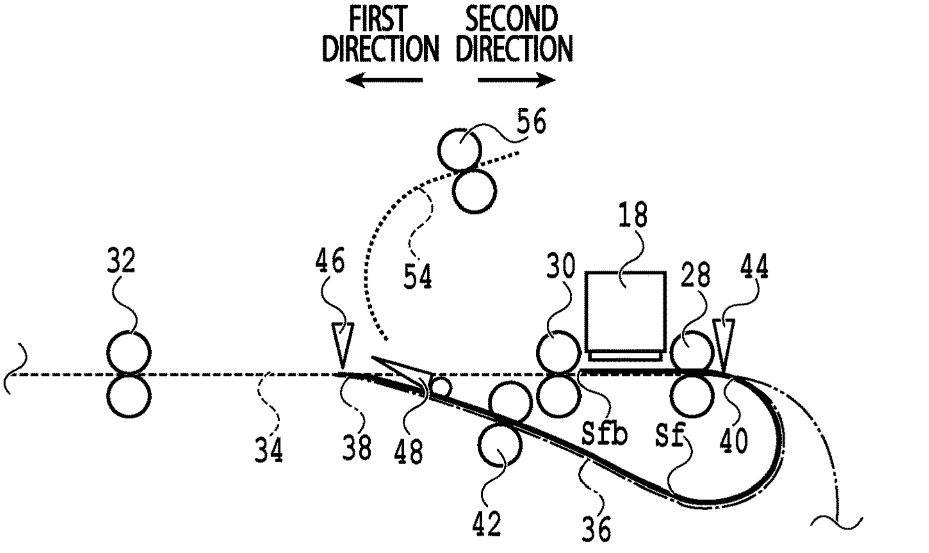

In a case where the flapper 48 is moved to the second position, the forward rotation of the reversal roller pair 32 is then stopped, and the reversal roller pair 32 is rotated reversely (rotated in an arrow B direction [see FIG. 4B]). As a result, the sheet S after printing on the first side is conveyed in the second direction. In a case where the sheet S is conveyed in the second direction, the sheet S conveyed in the first conveyance path 34 is guided to the second conveyance path 36 by the flapper 48 located in the second position and is conveyed along the second conveyance path 36 by the intermediate roller pair 42. After the sheet S is inserted into the second conveyance path 36, the flapper 48 is moved from the second position to the first position. As a result, the subsequent sheet Sf after printing on the first side can be conveyed along the first conveyance path 34. It should be noted that the sheet S conveyed in the second direction through the second conveyance path 36 and the subsequent sheet Sb conveyed in the first direction through the first conveyance path 34 are conveyed in a stacked manner downstream of the first junction 38 (the second sensor 46 and the flapper 48) in the first direction (see FIG. 4C).

The sheet S conveyed in the second conveyance path 36 is conveyed until the rear end Sb of the sheet S reaches the second junction 40 (see FIG. 5A) and is on standby in the position until a rear end Sib of the subsequent sheet Sf is detected by the first sensor 44. It should be noted that in the printing apparatus 10, the lengths of the first conveyance path 34 and the second conveyance path 36 are designed so that the sheet S conveyed through the second conveyance path 36 is away from the reversal roller pair 32 before the rear end Sb of the sheet S reaches the second junction 40. Further, in a case where the sheet S after printing on the first side is on standby in the second conveyance path 36, a region including a leading end Sa, that is, a predetermined region that includes the leading end Sa and is on the downstream side in the second direction is located in the first conveyance path 34. Accordingly, the subsequent sheet Sf is conveyed over the sheet S on standby on the downstream side of the first junction 38 in the first direction (see FIG. 5A).

In a case where the rear end Sib of the subsequent sheet Sf is detected by the first sensor 44, the sheet S on standby in the second conveyance path 36 is conveyed to the first conveyance path 34, and printing on the second side is performed. In a case where the rear end Sib of the subsequent sheet Sf is then detected by the second sensor 46, the flapper 48 is moved from the first position to the second position. Further, the forward rotation of the reversal roller pair 32 is stopped, the reversal roller pair 32 is rotated reversely, the subsequent sheet S is conveyed in the second direction, and the subsequent sheet S is inserted into the second conveyance path 36 by the flapper located in the second position.

It should be noted that the conveyance speed and the like are controlled so that the rear end Sib of the subsequent sheet Sf after printing on the first side is located downstream of the flapper 48 in the first direction before the flapper 48 is reached by the rear end Sb (located at the leading end in the first direction at this point in time) of the sheet S whose second side is to be printed. Accordingly, while the subsequent sheet S is conveyed to the second conveyance path 36, the sheet S after printing on the second side is guided to the exit path 54 by the flapper 48 located in the second position (see FIG. 5B).

After that, the sheet S guided to the exit path 54 is discharged to the stacking portion 22 by the discharge roller pair 56. Further, the subsequent sheet Sf is conveyed to the first conveyance path 34 via the second conveyance path 36, and printing on the second side is performed (see FIG. 5C).

Case Where the Ink Application Amount is Large

Figure 6:
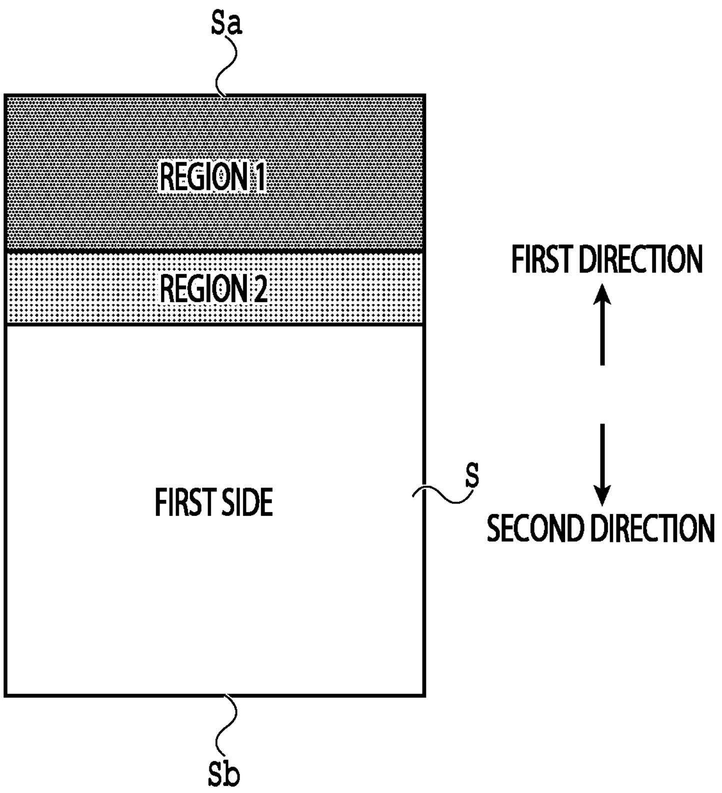
FIG. 6 is a diagram showing a region where a preceding sheet contacts a subsequent sheet.

Next, the behavior of the sheet S in a case where the amount of ink applied to the sheet S is large (for example, greater than a threshold value) will be described in detail below with reference to FIGS. 6 to 8C. FIG. 6 is a diagram showing a contact region in a preceding sheet in contact with a subsequent sheet. FIGS. 7A to 7D are diagrams showing the behavior of the sheet S in the second double-sided printing in a case where a large amount of ink is applied to a region 1 of the sheet S. FIGS. 8A to 8C are diagrams showing the behavior of the sheet S in the second double-sided printing in a case where a large amount of ink is applied to a region 2 of the sheet S. Incidentally, the first conveyance path 34 and the second conveyance path 36 are mainly shown in FIGS. 7A to 8C as in FIGS. 4A to 5C.

As described above, after printing on the first side of the subsequent sheet Sf, the sheet S contacts the subsequent sheet Sf on the downstream side of the first junction 38 in the first direction. In the contact region of the sheet S in contact with the subsequent sheet Sf, the sheet S and the subsequent sheet Sf may come into contact with each other in a case where the sheet S and the subsequent sheet Sf move in opposite directions, and the contact region includes the region 1 that the subsequent sheet Sf contacts even in a case where the sheet S is on standby in the second conveyance path 36 (see FIG. 6). The contact region also includes the region 2 where the sheet S and the subsequent sheet Sf may come into contact with each other in a case where the sheet S and the subsequent sheet Sf move in opposite directions. In other words, the region 1 corresponds to a region remaining in the first conveyance path 34 in a case where the sheet S is conveyed through the second conveyance path 36 and where the rear end Sb of the sheet S reaches the second junction 40. Further, the region 2 is a region located upstream of the region 1 in the first direction. Accordingly, the region 1 and the region 2 are regions where the sheet Sf may move in contact with the regions 1 and 2.

Thus, in a case where a large amount of ink is applied to the regions 1 and 2 of the sheet S, there is a possibility that the sheet Sf moving in contact with the regions 1 and 2 may reduce print quality in the regions 1 and 2 or that the ink applied to the regions 1 and 2 may be transferred to the subsequent sheet Sf. This may cause deterioration in product quality.

Thus, in the present embodiment, in a case where the ink application amount in the contact region is large, printing on the first side is started after the fed subsequent sheet Sf is kept on standby for predetermined time (standby time). Specifically, in a case where a large amount of ink is applied to the region 1, the subsequent sheet Sf is kept on standby before printing on the first side so that the sheet S on which the ink applied to the region 1 has dried contacts the subsequent sheet Sf. Further, in a case where a large amount of ink is applied to the region 2, after the rear end Sb of the sheet S conveyed to the second conveyance path 36 reaches the second junction 40, the subsequent sheet Sf is kept on standby before printing on the first side so that the leading end Sfa of the subsequent sheet Sf passes the first junction 38.

Case Where a Large Amount of Ink is Applied to the Region 1

First, a case where a large amount of ink is applied to the region 1 will be described. As in a case where the ink application amount is small, first, the sheet S stored in the storage portion 12 is fed by the feeding roller 24 via the feeding path 26 to the main conveyance roller pair 28. The fed sheet S is then conveyed along the first conveyance path 34 by the main conveyance roller pair 28, and printing on the first side is performed by the printing portion 18 (see FIG. 4A). After that, the sheet S after printing on the first side is conveyed, and the subsequent sheet Sf is fed at the time of the sheet S being conveyed by a predetermined amount after the rear end Sb of the sheet S is detected by the first sensor 44.

Figure 7A:
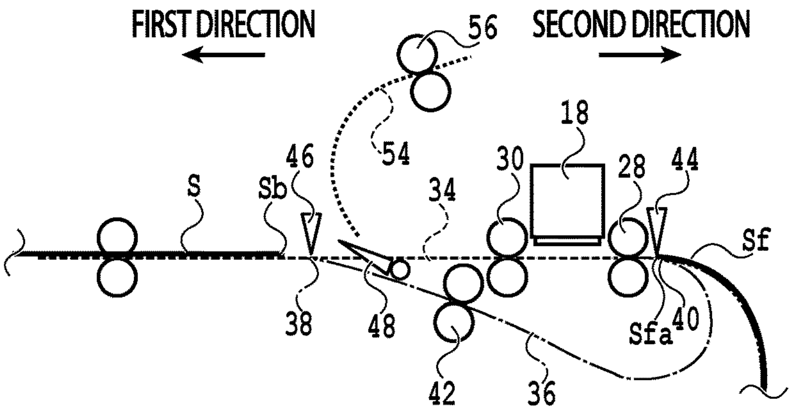
FIGS. 7A to 7D are diagrams showing the behavior of the sheet during the second double-sided printing in a case where a large amount of ink is applied to a region 1.
Figure 7B:
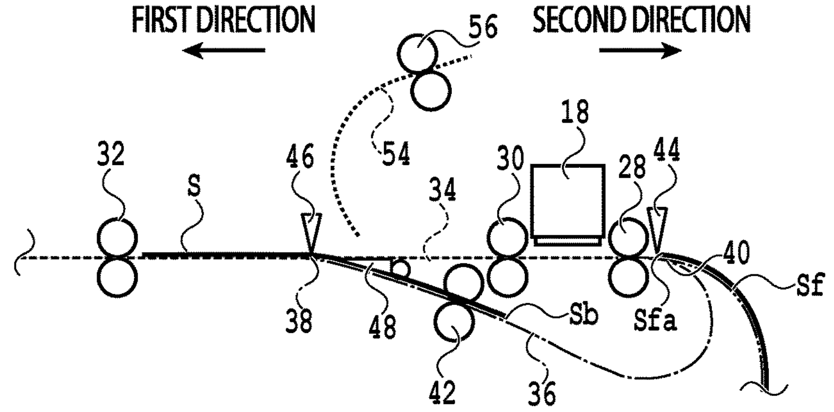
Figure 7C:
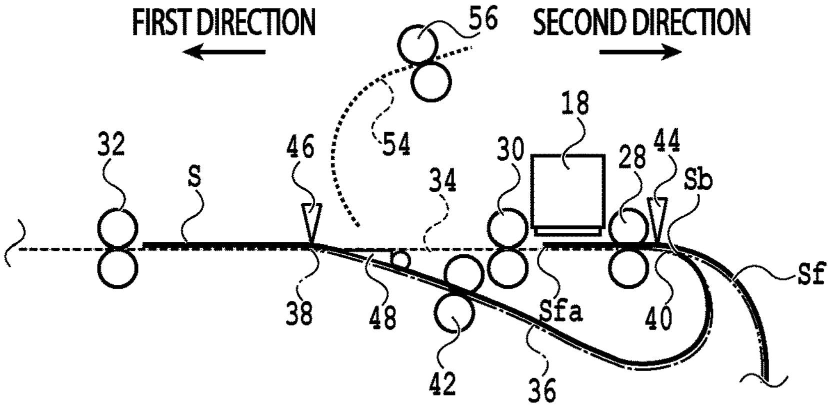
Figure 7D:
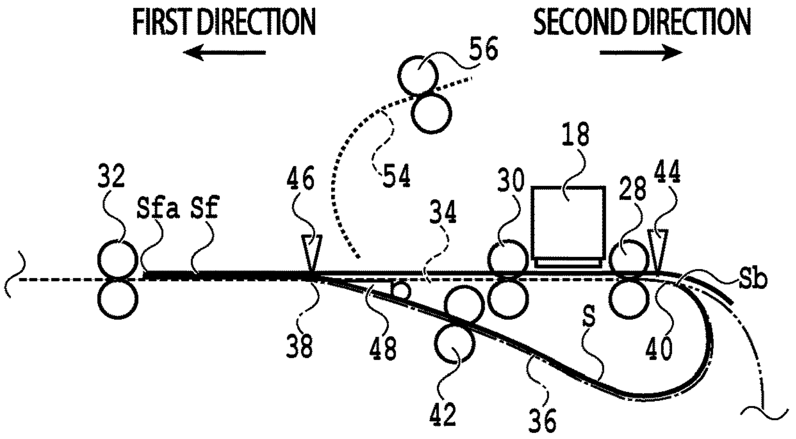
Figure 8A:
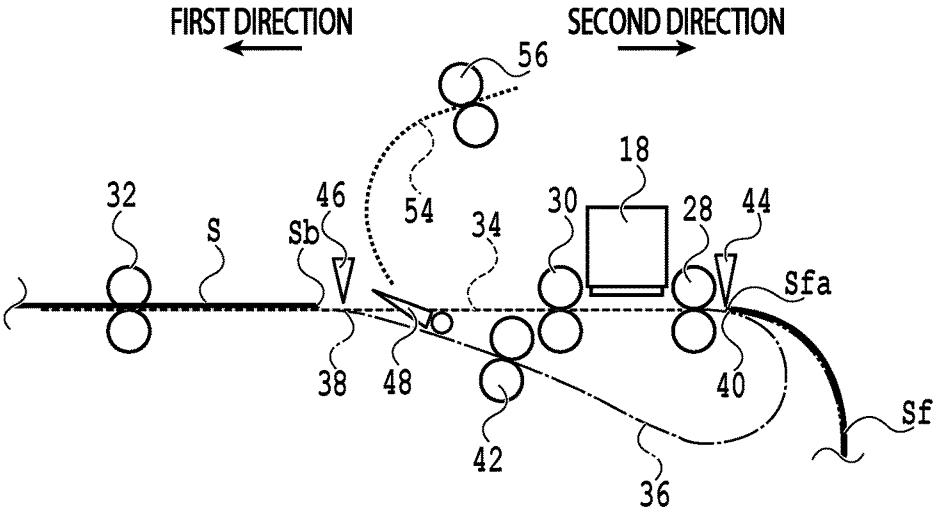
FIGS. 8A to 8C are diagrams showing the behavior of the sheet during the second double-sided printing in a case where a large amount of ink is applied to a region 2.
Figure 8B:
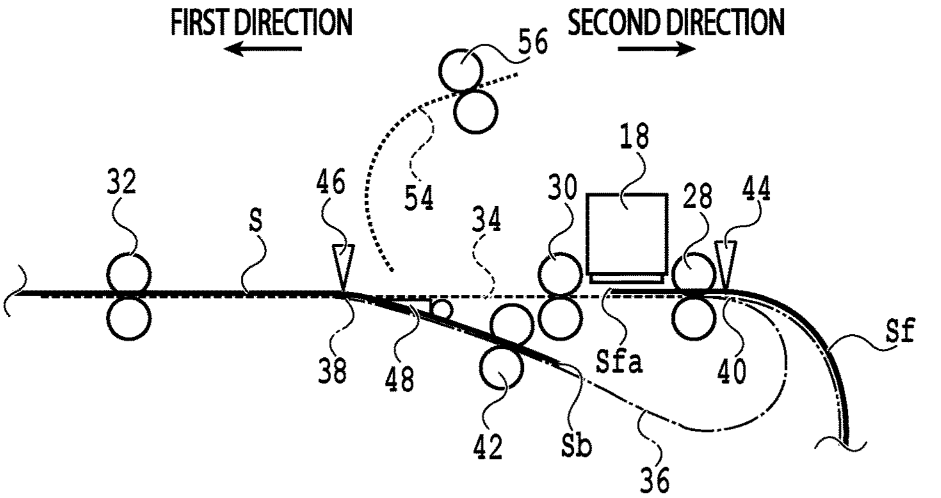
Figure 8C:
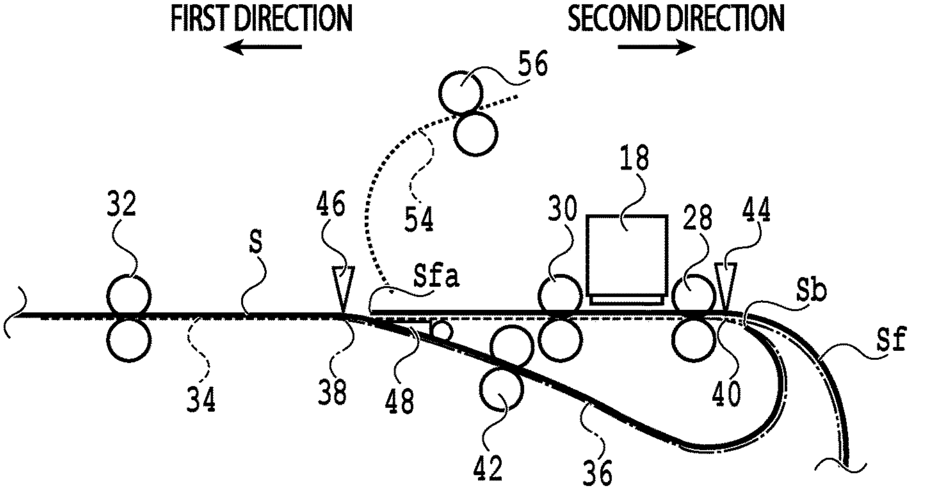

In a case where the leading end Sfa of the subsequent sheet Sf being fed is detected by the first sensor 44, the subsequent sheet Sf stops in that position in the feeding path 26 and is kept on standby for predetermined time (see FIG. 7A). In the following description, a position where the sheet is on standby within the feeding path 26 will be referred to as “first standby position.” While the subsequent sheet Sf is on standby in the first standby position, printing on the first side of the sheet S continues, and then the sheet S is conveyed in the first direction until the rear end Sb of the sheet S is detected by the second sensor 46 (see FIG. 7A). In a case where the rear end Sb is detected by the second sensor 46, the flapper 48 is moved from the first position to the second position. The sheet S is then conveyed in the second direction by the reversal roller pair 32, guided to the second conveyance path 36 by the flapper 48, and conveyed in the second conveyance path 36 (see FIG. 7B). After the sheet S is guided to the second conveyance path 36, the flapper 48 is moved from the second position to the first position. The sheet S is then stopped and kept on standby in the second conveyance path 36 in a position where the rear end Sb reaches the second junction 40 (see FIG. 7C). In the following description, the position where the sheet is on standby in the second conveyance path 36 will be referred to as “second standby position.”

Further, in a case where elapsed time in the first standby position reaches predetermined time, printing on the first side of the subsequent sheet Sf is started. As the printing of the subsequent sheet Sf proceeds, the subsequent sheet Sf is conveyed while contacting the region 1 of the sheet S located in the first conveyance path 34 on the downstream side of the first junction 38 in the first direction (see FIG. 7D). Here, the printing is started after the subsequent sheet Sf is kept on standby for predetermined time in the first standby position. Thus, the predetermined time for which the subsequent sheet Sf is kept on standby in the first standby position is set such that in a case where the sheet S and the subsequent sheet Sf are conveyed in contact with each other, the ink applied to the region 1 of the sheet S can be dried. It should be noted that the state where ink is dry is a state where the print quality on the sheet S does not deteriorate and where the ink applied to the sheet S is not transferred to the subsequent sheet Sf. As a result, even in a case where the subsequent sheet Sf is conveyed in contact with the region 1 of the sheet S, deterioration in print quality in the region and transfer of ink applied to the region to the subsequent sheet Sf are suppressed.

Case Where a Large Amount of Ink is Applied to the Region 2

Next, a case where a large amount of ink is applied to the region 2 will be described. As in a case where a large amount of ink is applied to the region 1, printing is performed on the first side of the fed sheet S, and the subsequent sheet Sf is fed at the time of the sheet S being conveyed by a predetermined amount after the rear end Sb of the sheet S after printing is detected by the first sensor 44. In a case where the leading end Sfa of the subsequent sheet Sf is then detected by the first sensor 44, the subsequent sheet Sf is stopped in the first standby position and is kept on standby for predetermined time (see FIG. 8A). While the subsequent sheet Sf is being fed and on standby, printing on the first side of the sheet S continues. In a case where the rear end Sb is then detected by the second sensor 46, the conveyance direction of the sheet S is reversed, and the sheet S is guided to the second conveyance path 36 by the flapper 48 in the second position and is conveyed to the second conveyance path 36 (see FIG. 8B). Here, the flapper 48 is moved from the second position to the first position. The process up to this point is the same as the case where a large amount of ink is applied to the region 1.

In a case where a large amount of ink is applied to the region 2, printing on the first side of the subsequent sheet Sf is started during the conveyance of the sheet S in the second direction by the reversal roller pair 32. That is, during the conveyance of the sheet S in the second direction, the predetermined time for which the subsequent sheet Sf is kept on standby in the first standby position has elapsed, and printing on the first side is started (see FIG. 8B). As the printing on the subsequent sheet Sf proceeds, the subsequent sheet Sf is conveyed while contacting the region 1 of the sheet S remaining in the first conveyance path 34 on the downstream side of the first junction 38 in the first direction. Here, the subsequent sheet Sf is kept on standby for the predetermined time in the first standby position, and then printing is started. Thus, the predetermined time for which the subsequent sheet Sf is kept on standby in the first standby position is set such that in a case where the sheet S and the subsequent sheet Sf are conveyed in contact with each other, the region 2 of the sheet S can be located in the second conveyance path 36. As a result, after the region 2 is located in the second conveyance path 36, the sheet S and the subsequent sheet Sf come into contact with each other (see FIG. 8C), which suppresses deterioration in print quality in the region 2 or transfer of the ink applied to the region 2 to the subsequent sheet Sf.

As described above, in a case where a large amount of ink is applied to the region 2, immediately after the region 2 is located in the second conveyance path 36, the leading end Sfa of the subsequent sheet Sf may be located on the downstream side of the first junction 38 in the first direction. On the other hand, in a case where a large amount of ink is applied to the region 1, ink in the region 1 located in the first conveyance path 34 must be dry in a case where the rear end Sb of the sheet S conveyed through the second conveyance path 36 reaches the second junction 40. Thus, in a case where a large amount of ink is applied to the region 2, the predetermined time, that is, standby time for which the subsequent sheet Sf is kept on standby in the first standby position can be reduced as compared to the case where a large amount of ink is applied to the region 1.

Processing Contents of Each Printing Process

Next, a description will be given of single-sided print processing in which the single-sided printing is performed, first double-sided print processing in which the first double-sided printing is performed, and second double-sided print processing in which the second double-sided printing is performed, each of which is executed by the printing apparatus 10.

Single-Sided Print Processing

Figure 9:
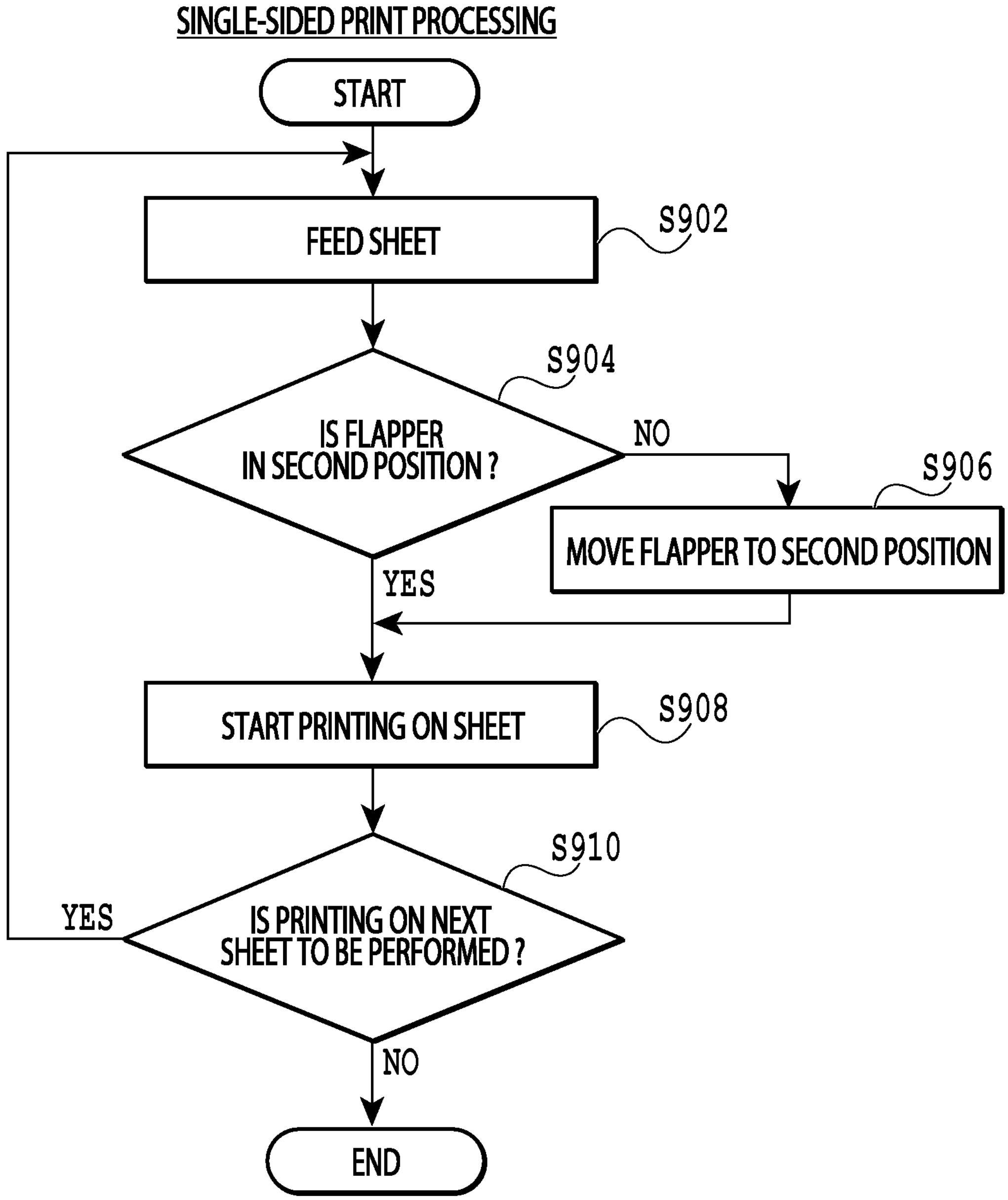
FIG. 9 is a flowchart showing processing contents of one-sided print processing.

First, a description will be given of the single-sided print processing in which printing is performed only on the first side of a sheet. FIG. 9 is a flowchart showing detailed processing contents of the single-sided print processing. A series of steps shown in the flowchart in FIG. 9 is performed by the CPU 202 loading a program code stored in the ROM 204 into the RAM 206 and executing the program code. Alternatively, a portion or all of the functions of the steps in FIG. 9 may be executed using hardware such as an ASIC or electrical circuit. In the specification of the present application, the symbol S in the description of each process means a step in a flowchart.

In a case where the single-sided print processing is started, in S902, the CPU 202 first feeds the sheet S stored in the storage portion 12 using the feeding roller 24. In S904, the CPU 202 then determines whether the flapper 48 is located in the second position. The printing apparatus 10 is provided with, for example, a sensor (not shown) capable of detecting the position of the flapper 48, and in S904, the CPU 202 makes a determination based on results of detection made by the sensor. The method of detecting the position of the flapper 48 is not limited to this, and various publicly known techniques can be used.

If it is determined in S904 that the flapper 48 is not in the second position, the process proceeds to S906, where the CPU 202 moves the flapper 48 to the second position, and the process proceeds to S908, which will be described later. Further, if it is determined in S904 that the flapper 48 is in the second position, the process proceeds to S908, where the CPU 202 starts printing on the first side of the sheet S being fed. After printing on the first side, the sheet S is guided to the exit path 54 by the flapper 48 and is then discharged to the stacking portion 22 by the discharge roller pair 56.

If printing on the sheet S is started, in S910, the CPU 202 then determines whether to perform printing on the next sheet S, and if it is determined to perform printing on the next sheet, the process returns to S902. Further, if it is determined in S910 not to perform printing on the next sheet S, the single-sided print processing ends.

First Double-Sided Print Processing

Figure 10:
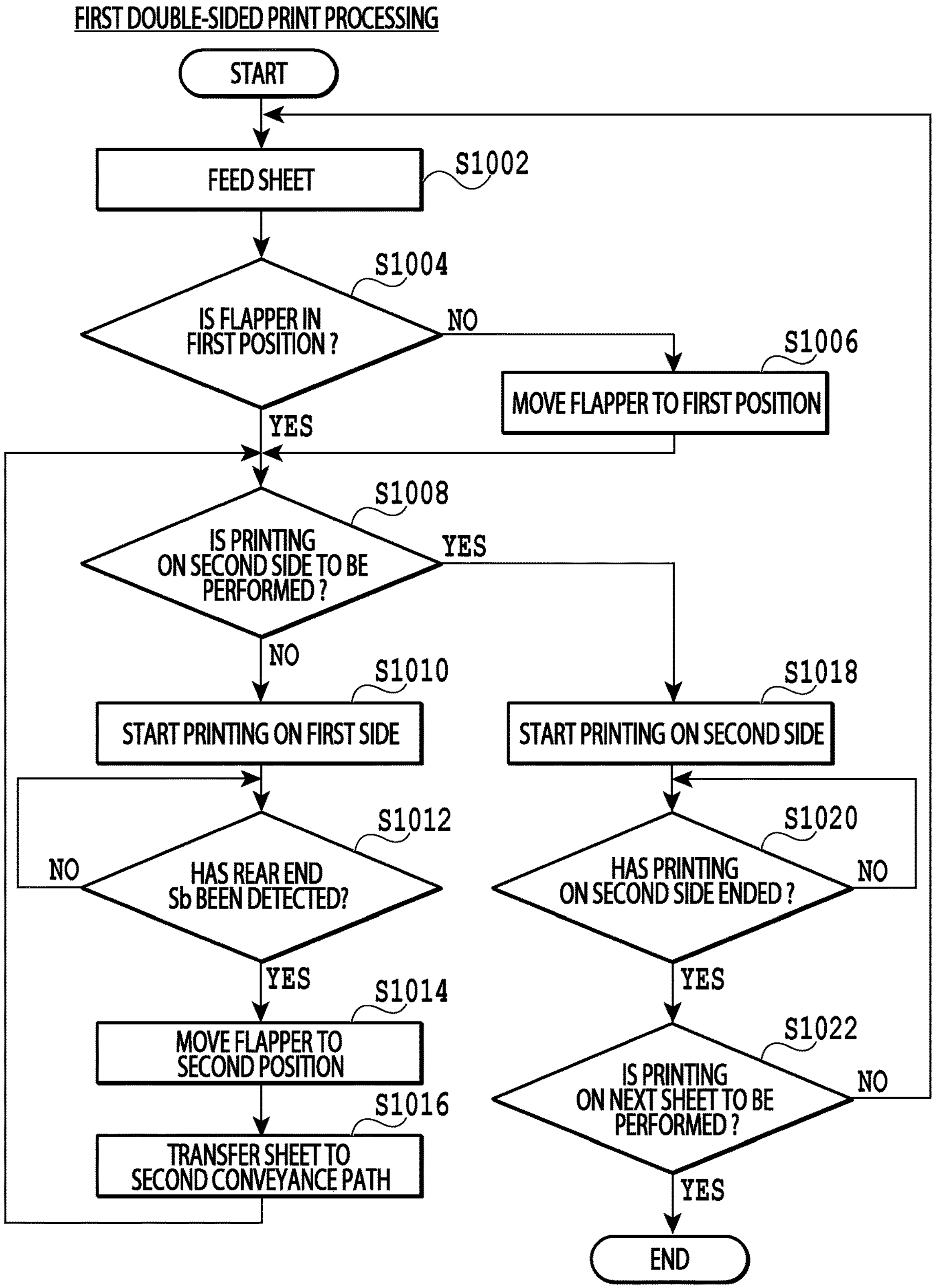
FIG. 10 is a flowchart showing processing contents of first double-sided print processing.

Next, a description will be given of the first double-sided print processing in which after the double-sided printing is performed on a sheet, the double-sided printing is performed on a subsequent sheet. FIG. 10 is a flowchart showing detailed processing contents of the first double-sided print processing. A series of steps shown in the flowchart in FIG. 10 is performed by the CPU 202 loading a program code stored in the ROM 204 into the RAM 206 and executing the program code. Alternatively, a portion or all of the functions of the steps in FIG. 10 may be executed using hardware such as an ASIC or electrical circuit.

If the first double-sided print processing is started, in S1002, the CPU 202 first feeds the sheet S stored in the storage portion 12 using the feeding roller 24. In S1004, the CPU 202 then determines whether the flapper 48 is located in the first position. If it is determined in S1004 that the flapper 48 is not in the first position, the process proceeds to S1006, where the CPU 202 moves the flapper 48 to the first position, and the process proceeds to S1008, which will be described later. Further, if it is determined in S1004 that the flapper 48 is in the first position, the process proceeds to S1008, where the CPU 202 determines whether printing on the second side of the sheet S is to be performed. Various publicly known techniques can be used for the method of determining whether printing on the second side of the sheet S is to be performed in S1008.

If it is determined in S1008 that printing on the second side is not to be performed, the process proceeds to S1010, where the CPU 202 starts printing on the first side of the sheet S. In S1012, the CPU 202 then determines whether the rear end Sb of the sheet S has been detected by the second sensor 46. If it is determined in S1012 that the rear end Sb has not been detected, it is determined that the entire sheet S is not yet located on the downstream side of the second sensor 46 in the first direction, and S1012 is executed again. It should be noted that if the determination that the rear end Sb has not been detected continues for a certain period of time in S1012, the first double-sided print processing may be ended on the presumption that an error has occurred.

Further, in S1012, if it is determined that the rear end Sb has been detected, it is determined that the entire sheet S is located on the downstream side of the second sensor 46 in the first direction, and the process proceeds to S1014, where the CPU 202 moves the flapper 48 to the second position. It should be noted that if it is determined that the rear end Sb has been detected, the CPU 202 stops the reversal roller pair 32 rotating forward and stops the movement of the sheet S in the first direction. After that, in S1016, the CPU 202 reverses the rotation of the reversal roller pair 32 to convey the sheet S to the second conveyance path 36, and the process returns to S1008. By reversing the rotation of the reversal roller pair 32 in S1016, the sheet S after printing on the first side is guided to the second conveyance path 36 by the flapper 48 conveyed in the second direction and located in the second position, and then, conveyed through the second conveyance path 36 by the intermediate roller pair 42.

On the other hand, if it is determined in S1008 that printing on the second side is to be performed, the process proceeds to S1018, and the CPU 202 starts printing on the second side of the sheet S. After that, in S1020, the CPU 202 determines whether printing on the second side has ended, that is, whether the double-sided printing on the sheet S has ended. The printing apparatus 10 is provided, for example, with a sensor capable of detecting the discharge of a sheet, and in S1020, it is determined whether the sheet has been discharged based on results of detection made by the sensor. It should be noted that the determination as to whether printing on the second side has ended is not limited to this, and various publicly known techniques can be used.

If it is determined in S1020 that printing on the second side has not ended, S1020 is executed again. It should be noted that if the determination that the printing on the second side has not ended continues for a certain period of time in S1020, the first double-sided print processing may be ended on the presumption that an error has occurred. Further, if it is determined in S1020 that the printing on the second side has ended, the process proceeds to S1022, where the CPU 202 determines whether to perform printing on the next sheet S, and if the CPU 202 determines to perform printing on the next sheet, the process returns to S1002. Further, in S1022, if it is determined not to perform printing on the next sheet S, the first double-sided print processing is ended.

Second Double-Sided Print Processing

Figure 11:
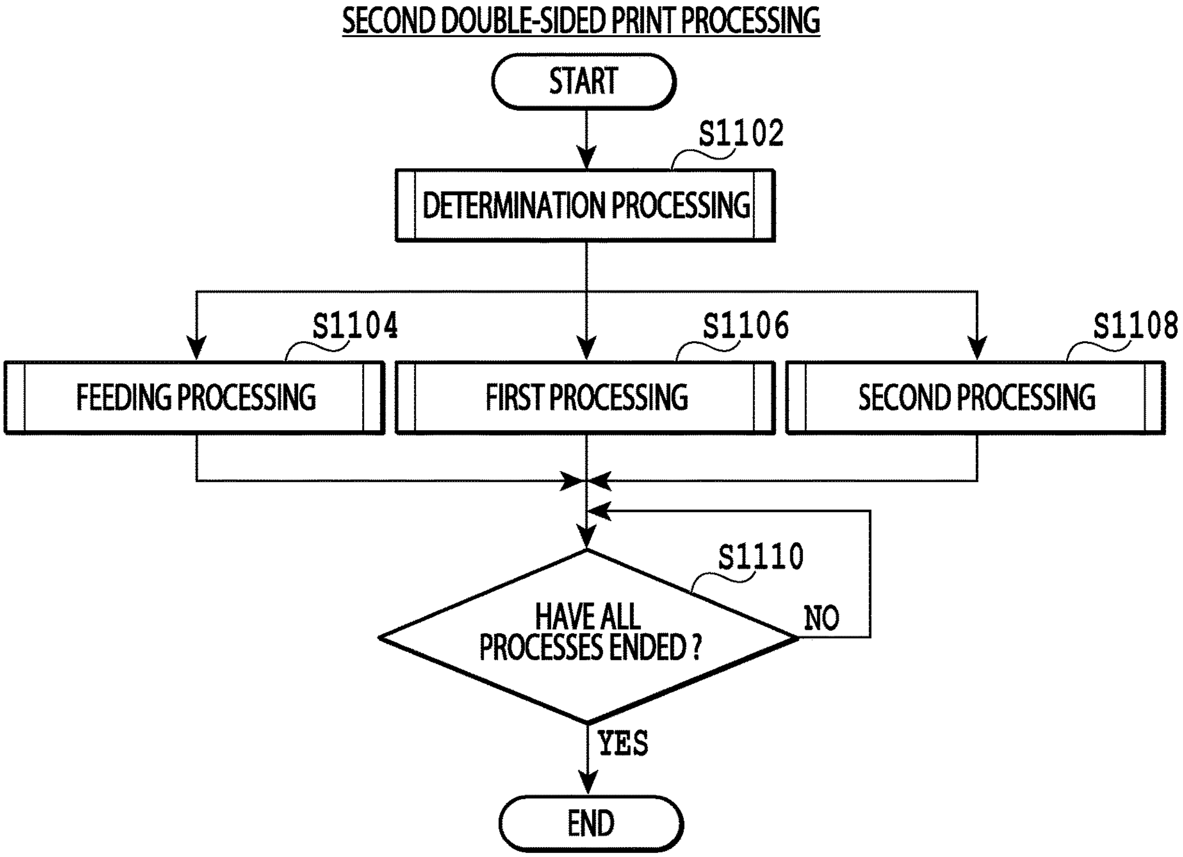
FIG. 11 is a flowchart showing processing contents of second double-sided print processing.

Next, a description will be given of second double-sided print processing n which in the case of performing printing on both sides of a sheet, printing on the first side of the subsequent sheet is performed between printing on the first side and printing on the second side of the preceding sheet. FIG. 11 is a flowchart showing detailed processing contents of the second double-sided print processing. A series of steps shown in the flowchart in FIG. 11 is performed by the CPU 202 loading a program code stored in the ROM 204 into the RAM 206 and executing the program code. Alternatively, a portion or all of the functions of the steps in FIG. 11 may be executed using hardware such as an ASIC or electrical circuit.

If the second double-sided print processing is started, in S1102, the CPU 202 first executes determination processing in which predetermined time for which the subsequent sheet Sf is kept on standby in the first standby position is determined. Detailed processing contents of the determination processing will be described later. Next, the process proceeds to S1104, where the CPU 202 executes feeding processing in which a sheet stored in the storage portion 12 is fed. The process then proceeds to S1106, where the CPU 202 executes first processing in which printing is performed on the first side of the fed sheet. The process further proceeds to S1108, where the CPU 202 executes second processing in which printing is performed on the second side of the sheet after printing on the first side. That is, after the determination processing ends, S1104, S1106, and S1108 are executed in parallel. Detailed processing contents of the feeding processing, the first processing, and the second processing will be described later. After that, in S1110, the CPU 202 determines whether all of the feeding processing, the first processing, and the second processing have ended. If it is determined in S1110 that all of the feeding processing, first processing, and second processing have ended, the second double-sided print processing is ended.

Determination Processing

Figure 12:
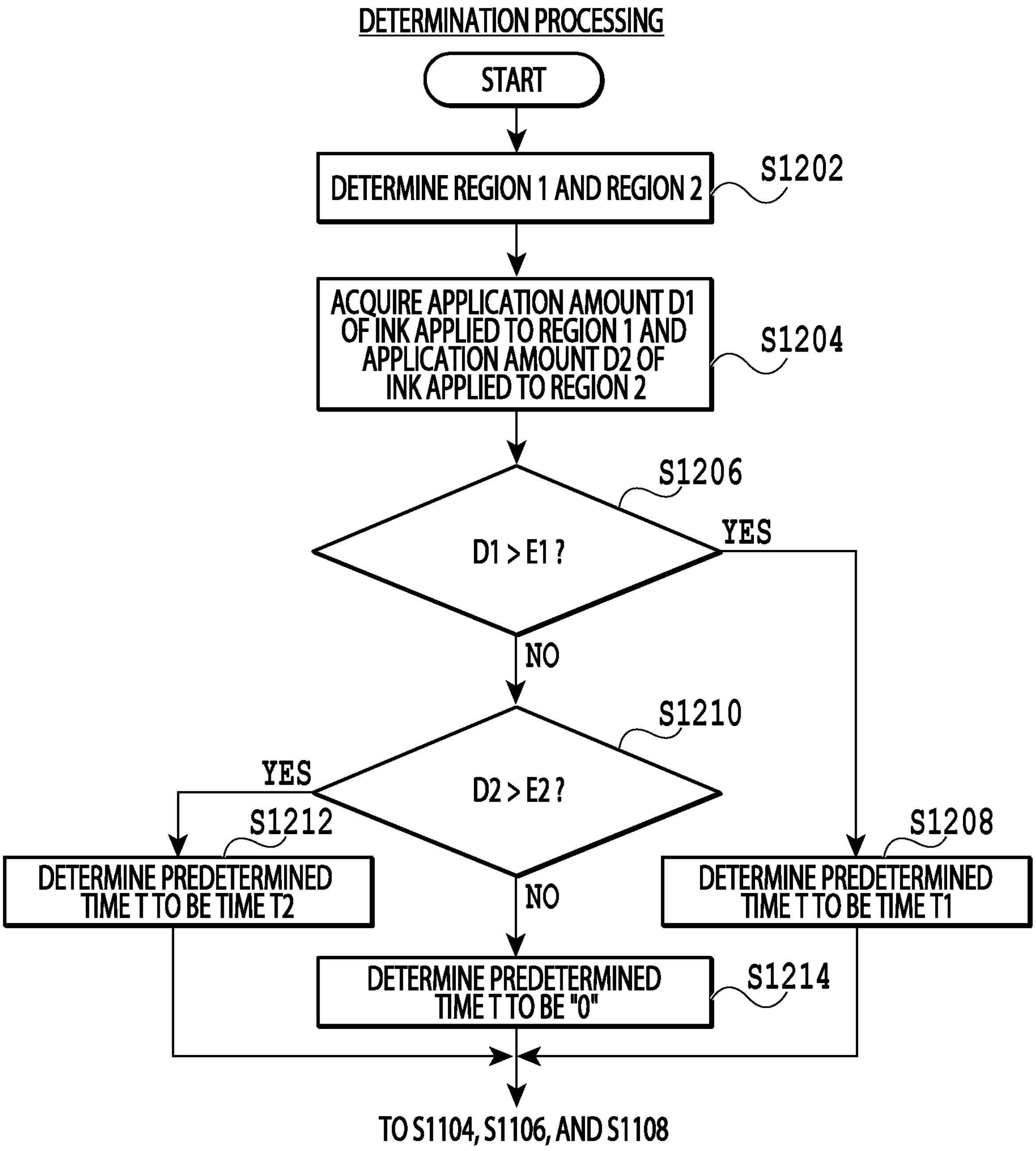
FIG. 12 is a flowchart showing processing contents of determination processing of the subroutine of the second double-sided print processing.

Here, the determination processing executed in the second double-sided print processing will be described. FIG. 12 is a flowchart showing detailed processing contents of the determination processing.

If the determination processing is started, in S1202, the CPU 202 first determines the region 1 and the region 2 on a sheet. In a case where the sheet is located in the second standby position, the region 1 located in the first conveyance path 34 is determined depending on, for example, the size of the sheet and the length from the first junction 38 to the second junction 40. Further, the region 2 that may contact a subsequent sheet on which printing has started without being kept on standby in the first standby position is determined, for example, according to print data. The region 1 and region 2 may be different depending on, for example, the type of ink used or the type of sheet used.

Next, in S1204, the CPU 202 acquires the amount D1 of ink applied to the region 1 and the amount D2 of ink applied to the region 2. The application amounts D1 and D2 are acquired based on print data. After that, in S1206, the CPU 202 determines whether the application amount D1 is greater than a threshold value E1, that is, whether D1>E1. If it is determined in S1206 that D1>E1, the process proceeds to S1208, the CPU 202 sets predetermined time T, which is standby time in the first standby position, to time T1, and the process proceeds to a step such as S1104.

Further, if it is determined in S1206 that D1>E1 is not satisfied, the process proceeds to S1210, where the CPU 202 determines whether the application amount D2 is greater than a threshold value E2, that is, whether D2>E2. If it is determined in S1210 that D2>E2, the process proceeds to S1212, where the CPU 202 sets the predetermined time T to time T2, and the process proceeds to a step such as S1104. On the other hand, if it is determined in S1210 that D2>E2 is not satisfied, the process proceeds to S1214, where the CPU 202 sets the predetermined time T to "0," and the process proceeds to a step such as S1104.

Here, the threshold value E1 is appropriately set depending on, for example, the type of ink used, the type of sheet, a conveyance speed, and the like. Further, the time T1 is time required for drying the ink applied to the region 1. In other words, the time T1 is set to the lower limit value of the predetermined time such that even in a case where the region 1 of the sheet S in the second standby position contacts the subsequent sheet Sf in which printing on the first side has started after predetermined standby time, no deterioration in print quality and no ink transfer occur. Alternatively, the time T1 takes a value greater than the lower limit value by a certain amount. It should be noted that a larger amount of ink than the threshold value E1 is applied to the region 1 of the sheet S in the second standby position.

Further, the threshold value E2 is set to the upper limit value of the application amount such that, for example, after the subsequent sheet Sf is kept on standby in the first standby position for the time T2 determined in S1212, even in a case where the subsequent sheet Sf on which printing has been started contacts the sheet S being conveyed to the second standby position, no deterioration in print quality and no ink transfer occurs. Alternatively, the threshold value E2 is set to be smaller than the upper limit value by a certain amount. The time T2 is determined as follows. Time from the time at which printing on the subsequent sheet Sf starts without standby time until the sheet S on which printing has been performed in advance is moved through the second conveyance path 36 and the rear end Sb reaches the second junction 40 is t1. Further, time required for the subsequent sheet Sf to reach the first junction 38 from the first standby position is t2. In the printing apparatus 10, in a case where $t2 \leq t1$, the time T2 takes a value greater than the absolute value ($|t1-t2|$) of a difference between the time t1 and time t2, that is, a value obtained by adding a predetermined value to the difference between t1 and t2. The predetermined value may be a fixed value or a value that varies depending on the difference value. Further, in a case where $t2>t1$ in the printing apparatus 10, the time T2 is "0."

Feeding Processing

Figure 13:
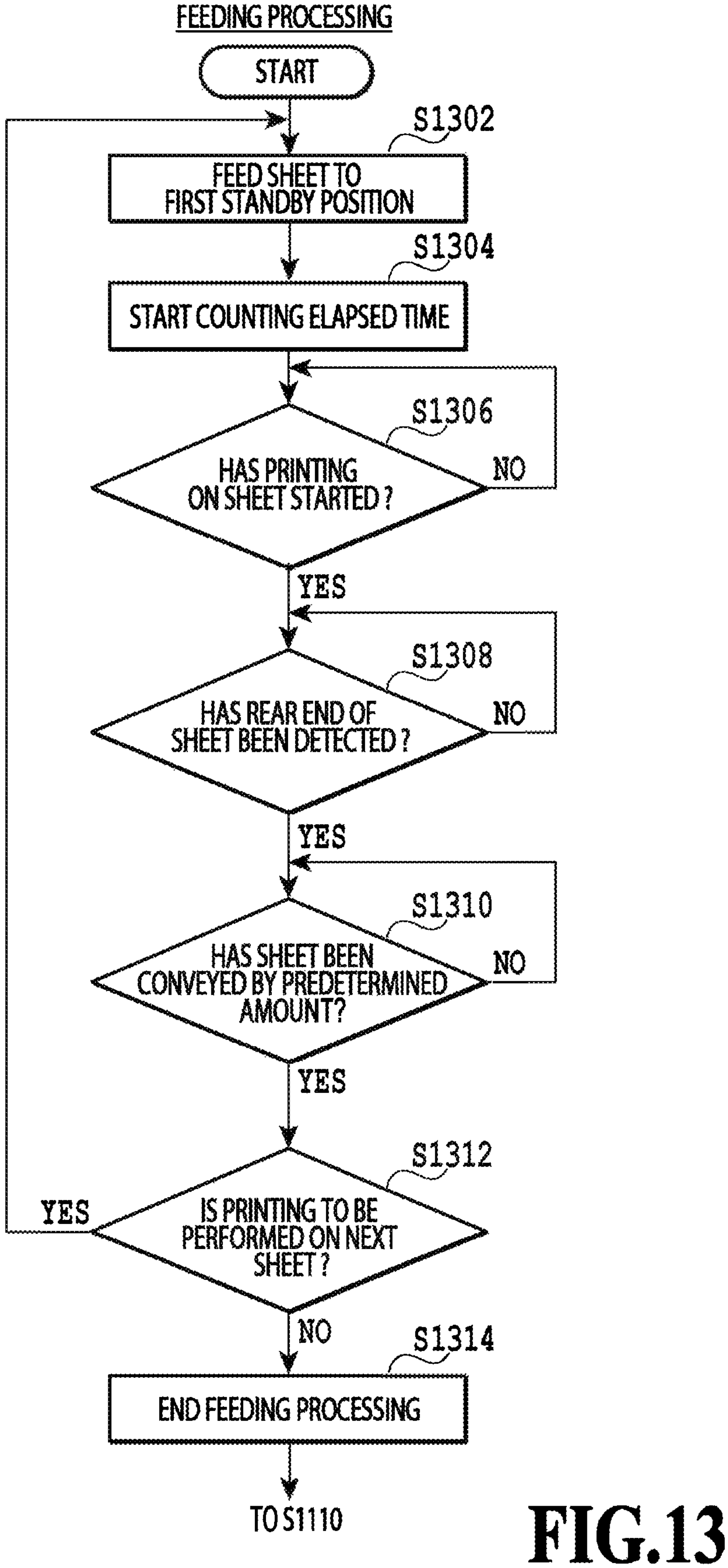
FIG. 13 is a flowchart showing processing contents of feeding processing of the subroutine of the second double-sided print processing.

Next, a description will be given of feeding processing executed in parallel with the first processing and the second processing in the second double-sided print processing. FIG. 13 is a flowchart showing detailed processing contents of the feeding processing.

If the feeding processing is started, in S1302, the CPU 202 first feeds the sheet S stored in the storage portion 12 to the first standby position. In S1302, the sheet S fed to the feeding path 26 using the feeding roller 24 is fed to a position where the leading end Sa of the sheet S is detected by the first sensor 44. Next, in S1304, the CPU 202 starts counting elapsed time. That is, in S1304, the elapsed time after the sheet S is conveyed to the first standby position is counted.

After that, in S1306, the CPU 202 determines whether printing on the sheet S in the first standby position has started. If it is determined in S1306 that the printing on the sheet S in the first standby position has started, the process proceeds to S1308, where the CPU 202 determines whether the rear end Sb of the sheet S on which the printing has been started has been detected by the first sensor 44. If it is determined in S1308 that the rear end Sb of the sheet S has been detected by the first sensor 44, the process proceeds to S1310, where the CPU 202 determines whether the sheet S has been conveyed by a predetermined amount after the detection of the rear end Sb by the first sensor 44.

If it is determined in S1310 that the sheet S has been conveyed by the predetermined amount, the process proceeds to S1312, where the CPU 202 determines whether printing is to be performed on the next sheet S (subsequent sheet Sf). If it is determined in S1312 that printing is to be performed on the next sheet S, the process returns to S1302. If it is determined in S1312 that printing is not to be performed on the next sheet 5, the process proceeds to S1314, where the CPU 202 ends this feeding processing, and the process proceeds to S1110.

If it is determined in S1306 that the printing on the sheet S in the first standby position has not been started, S1306 is executed again. It should be noted that if the determination that the printing on the sheet S in the first standby position has not been started continues for a certain period of time, the second double-sided print processing may be ended on the presumption that an error has occurred. Further, if it is determined in S1306 that the printing on the sheet S in the first standby position has started, the count value of which counting has been started from S1304 is initialized.

If it is determined in S1308 that the rear end Sb of the sheet S has not been detected by the first sensor 44, S1308 is executed again. It should be noted that if the determination that the rear end Sb of the sheet S has not been detected by the first sensor 44 continues for a certain period of time, the second double-sided print processing may be ended on the presumption that an error has occurred. Further, if it is determined in S1310 that the sheet S has not been conveyed by the predetermined amount, S1310 is executed again. It should be noted that if the determination that the sheet S has not been conveyed by the predetermined amount continues for a certain period of time, the second double-sided print processing may be ended on the presumption that an error has occurred.

First Processing

Figure 14:
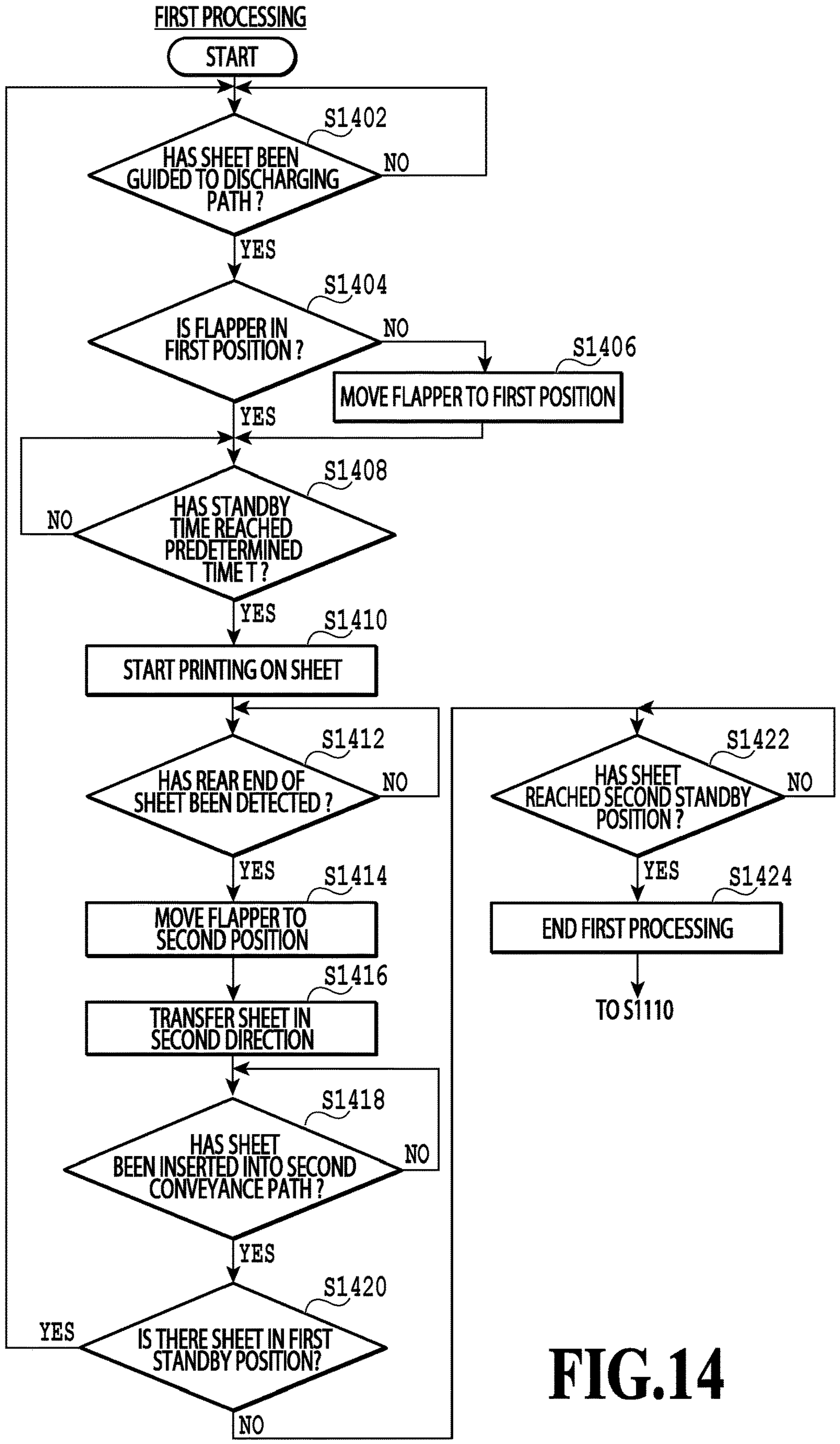
FIG. 14 is a flowchart showing processing contents of first processing of the subroutine of the second double-sided print processing.

Next, a description will be given of the first processing executed in parallel with the feeding processing and the second processing in the second double-sided print processing. FIG. 14 is a flowchart showing detailed processing contents of the first processing.

If the first processing in which printing is performed on the first side of the sheet fed in the feeding processing is started, in step S1402, the CPU 202 first determines whether the sheet S whose second side has been printed in the second processing has been guided to the exit path 54. In S1402, if the sheet S is guided to the exit path 54 or if there is no sheet S on which printing has been performed in advance (that is, printing to be performed on the sheet S is first printing), it is determined that the sheet S has been guided. To determine whether the sheet S has been guided to the exit path 54, various publicly known detection methods such as providing the exit path 54 with a sensor that detects the presence of the sheet S can be used.

If it is determined in S1402 that, the sheet S has been guided to the exit path 54, the process proceeds to S1404, where the CPU 202 determines whether the flapper 48 is in the first position, and if it is determined that the flapper 48 is in the first position, the process proceeds to S1408, which will be described later. If it is determined in S1404 that the flapper 48 is not in the first position, the process proceeds to S1406, where the CPU 202 moves the flapper 48 to the first position, and the process proceeds to S1408.

In S1408, the CPU 202 determines whether standby time for which the sheet S in the first standby position is kept on standby has reached the predetermined time T. In S1408, the determination is made using the predetermined time T determined in the determination processing in S1102 and the count value of which counting has been started from S1104. That is, in S1408, it is determined whether the count value has reached the predetermined time T. It should be noted that this step may be omitted for the sheet Son which first printing is performed.

If it is determined in S1408 that the standby time for which the sheet S in the first standby position is kept on standby has reached the predetermined time T, in S1410, the CPU 202 starts printing on the first side of the sheet S in the first standby position. That is, in S1410, the sheet S is conveyed in the first direction from the first standby position through the first conveyance path 34, and the printing portion 18 pet-forms printing, based on print data, on the first side of the sheet S facing the print head 50.

Next, in S1412, the CPU 202 determines whether the second sensor 46 has detected the rear end Sb of the sheet S whose first side has been printed. If it is determined in S1412 that the rear end Sb of the sheet S has been detected by the second sensor 46, the process proceeds to S1414, where the CPU 202 moves the flapper 48 to the second position. At this time, the forward rotation of the reversal roller pair 32 is stopped. Further, at this time, if printing is to be performed on the next sheet S (subsequent sheet Sf), the sheet S to be printed next is being fed or has already been fed to the first standby position through the feeding processing.

After that, in S1416, the CPU 202 reverses the rotation of the reversal roller pair 32 to convey the sheet S after printing on the first side in the second direction to the second conveyance path 36. In S1418, the CPU 202 then determines whether the sheet S after printing on the first side has been inserted into the second conveyance path 36. In S1418, the determination is made based on, for example, the amount of rotation of the reversal roller pair 32 after the reversal. The sheet S inserted into the second conveyance path 36 is conveyed until the rear end Sb of the sheet S reaches the second junction 40.

If it is determined in S1418 that the sheet S after printing on the first side has been inserted into the second conveyance path 36, the process proceeds to S1420, where the CPU 202 determines whether the sheet S (subsequent sheet Sf) on standby is in the first standby position. In S1420, for example, it is determined whether the sheet S has been detected by the first sensor 44, and if the sheet S has been detected, it is determined that the sheet S is on standby in the first standby position.

If it is determined in S1420 that the sheet S on standby is in the first standby, position, the process returns to S1402. Further, if it is determined in S1420 that there is no sheet S on standby in the first standby position, the process proceeds to S1422, where the CPU 202 determines whether the sheet S in the second conveyance path 36 has reached the second standby position. It should be noted that various publicly known techniques can be used for the method of detecting the arrival of the sheet S in the second standby position, that is, the arrival of the rear end Sb in the second junction 40 in S1422. For example, there may be provided a sensor to detect the arrival of the sheet S in the second standby position, or the detection may be made based on the amount of rotation of the reversal roller pair 32, the intermediate roller pair 42, or the like. If it is determined in S1422 that the sheet S has reached the second standby position, the process proceeds to S1424, where the CPU 202 ends this first processing, and the process proceeds to S1110.

If it is determined in S1402 that the sheet S has not been guided to the exit path 54, S1402 is executed again. It should be noted that if the determination that the sheet S has not been guided to the exit path 54 continues for a certain period of time, the second double-sided print processing may be ended on the presumption that an error has occurred. Further, in S1408, if it is determined that the standby time for which the sheet S in the first standby position is kept on standby has not reached the predetermined time T, S1408 is executed again. It should be noted that if the determination that the standby time for which the sheet S in the first standby position is kept on standby has not reached the predetermined time T continues for a certain period of time, the second double-sided print processing may be ended on the presumption that an error has occurred.

Further, if it is determined in S1412 that the rear end Sb of the sheet S has not been detected by the second sensor 46, S1412 is executed again. It should be noted that if the determination that the rear end Sb of the sheet S has not been detected by the second sensor 46 continues for a certain period of time, the second double-sided print processing may be ended on the presumption that an error has occurred. Furthermore, if it is determined in S1418 that the sheet S after printing on the first side has not been inserted into the second conveyance path 36, S1418 is executed again. It should be noted that if the determination that the sheet S after printing on the first side has not been inserted into the second conveyance path 36 continues for a certain period of time, the second double-sided print processing may be ended on the presumption that an error has occurred. Further, if it is determined in S1422 that the sheet S has not reached the second standby position, S1422 is executed again. It should be noted that if the determination that the sheet S has not reached the second standby position continues for a certain period of time, the second double-sided print processing may be ended on the presumption that an error has occurred.

Second Processing

Figure 15:
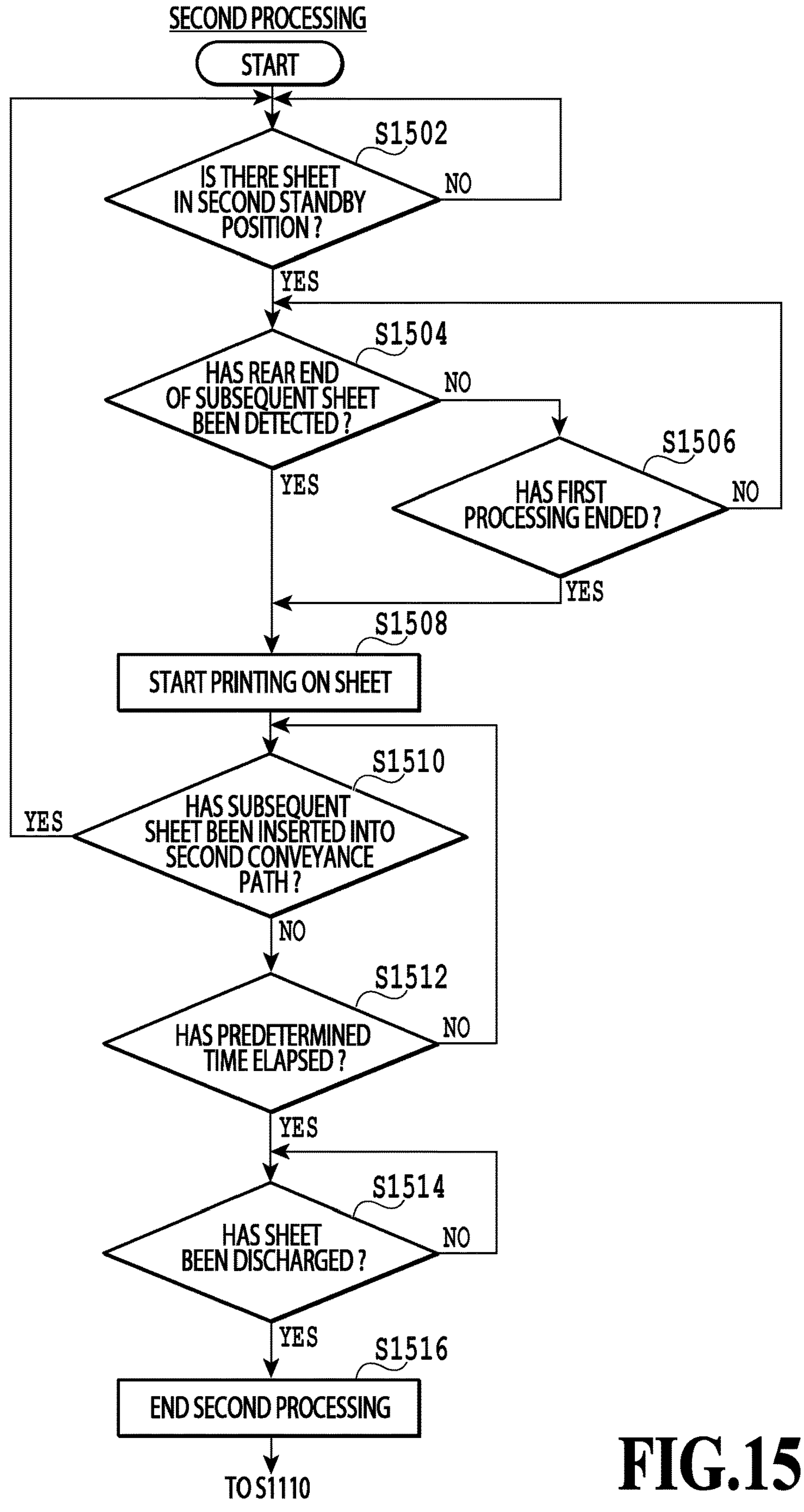
FIG. 15 is a flowchart showing processing contents of second processing of the subroutine of the second double-sided print processing.

Next, a description will be given of the second processing executed in parallel with the feeding processing and the first processing in the second double-sided print processing. FIG. 15 is a flowchart showing detailed processing contents of the second processing.

If the second processing in which printing is performed on the second side of the sheet conveyed to the second standby position through the first processing is started, in S1502, the CPU 202 first determines whether the sheet S is in the second standby position. If it is determined in S1502 that the sheet S is in the second standby position, the process proceeds to S1504, where the CPU 202 determines whether the rear end Sfb of a sheet (subsequent sheet Sf) whose first side has been printed subsequent to the sheet S has been detected by the first sensor 44.

If it is determined in S1504 that the rear end Sfb of the subsequent sheet Sf has been detected by the first sensor 44, the process proceeds to subsequent S1508. Further, if it is determined in S1504 that the rear end Sfb of the subsequent sheet Sf has not been detected by the first sensor 44, the process proceeds to S1506, where the CPU 202 determines whether the first processing has ended. If it is determined in S1508 that the first processing has ended, the process proceeds to S1508. In S1508, the CPU 202 then starts printing on the second side of the sheet S in the second standby position, That is, in S1508, the sheet S is conveyed in the first direction from the second standby position through the first conveyance path 34, and the printing portion 18 performs printing, based on print data, on the second side of the sheet facing the print head 50. It should be noted that in the first processing that is being executed in parallel with the printing on the second side of the sheet S, since the flapper 48 is moved to the second position, the sheet during printing on the second side is guided to the exit path 54 by the flapper 48 in the second position as the printing proceeds.

Next, in S1510, the CPU 202 determines whether the subsequent sheet Sf has been inserted into the second conveyance path 36, and if it is determined that the subsequent sheet Sf has been inserted into the second conveyance path 36, the process returns to S1502. Further, if it is determined in S1510 that the subsequent sheet Sf has not been inserted into the second conveyance path 36, the process proceeds to S1512, where the CPU 202 determines whether set time has elapsed. That is, in S1512, it is determined whether the set time has elapsed after the determination in S1510 to which the process proceeds from S1508 that the subsequent sheet Sf has not been inserted into the second conveyance path 36.

If it is determined in S1512 that the set time has not elapsed, the process returns to S1510. Further, if it is determined in S1512 that the set time has elapsed, the process proceeds to S1514, where the CPU 202 determines whether the sheet S after printing on the second side has been discharged. If it is determined in S1514 that the sheet S has been discharged, the process proceeds to S1516, where the CPU 202 ends this second processing, and the process proceeds to S1110.

If it is determined in S1502 that there is no sheet S in the second standby position, S1502 is executed again. It should be noted that if the determination that there is no sheet S in the second standby position continues for a certain period of time, the second double-sided print processing may be ended on the presumption that an error has occurred. Further, in S1506, if the determination that the first processing has not ended continues for a certain period of time, the second double-sided print processing may be ended on the presumption that an error has occurred.

Further, in S1512, if the determination that the set time has not elapsed continues a certain number of times, the second double-sided print processing may be ended on the presumption that an error has occurred. Furthermore, if it is determined in S1514 that the sheet S after printing on the second side has not been discharged, S1514 is executed again. Alternatively, in S1514, if the determination that the sheet S after printing on the second side has not been discharged continues for a certain period of time, the second double-sided print processing may be ended on the presumption that an error has occurred.

Function and Effect

As described above, in the printing apparatus 10 according to the present embodiment, before starting printing on the first side of a subsequent sheet, the subsequent sheet is kept on standby for predetermined time between printing on the first side of a preceding sheet and printing on the second side of the sheet. This makes it possible to ensure time for the ink applied to the preceding sheet to dry and to shift the timing of contact between the preceding sheet and the subsequent sheet. Thus, it is possible to suppress deterioration in the print quality of the preceding sheet and to suppress the transfer of ink to the subsequent sheet.

Other Embodiments

It should be noted that the above embodiment may be modified as shown in (1) to (4) below.

(1) In the above embodiment, in the determination processing, the time T1 and time T2 each of which takes a fixed value are determined so as to correspond to the application amounts D1 and D2, respectively, but the present invention is not limited to this. That is, the time T1 and time T2 may vary depending on the values of the application amounts D1 and D2, respectively.

(2) in the above embodiment, the printing apparatus 10 is a serial scan type printing apparatus, but the present invention is not limited to this. For example, the printing apparatus 10 may be a full-line type printing apparatus that performs printing using a print head in which an ink ejection portion having a length corresponding to the length of the sheet S in the width direction is formed.

(3) In the above embodiment, in the determination processing executed by the control portion 200, the amount of ink applied to the region 1 and region 2 is acquired, and the predetermined time which is the standby time in the first standby position is determined in accordance with the acquired application amount, but the present invention is not limited to this. For example, the determination processing may be executed by an external device such as the host device 210.

(4) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(5) The embodiment described above and the various modifications shown in (1) and (4) above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-105837, filed Jun. 28, 2023, which is hereby incorporated by reference herein in its entirety.

What is claimed is:

1. A printing apparatus comprising:

a feeding unit configured to feed a print medium to a first position;

a conveyance unit capable of conveying, in a first direction, the print medium fed to the first position by the feeding unit;

a printing unit configured to perform printing by applying ink to the print medium conveyed in the first direction by the conveyance unit;

a reversal conveyance path configured to reverse the print medium to be conveyed in a second direction opposite to the first direction after printing using the printing unit, the reversal conveyance path meeting a conveyance path for a print medium conveyed in the first direction at a first junction on a downstream side of the printing unit with respect to the first direction and a second junction on an upstream side of the printing unit with respect to the first direction;

a control unit configured to control the conveyance unit and the printing unit to execute printing on a first side and a second side opposite to the first side of a first print medium and a second print medium subsequent to the first print medium;

an acquisition unit configured to acquire an application amount of the ink applied to a region of the first print medium conveyed through the reversal conveyance path that the second print medium being conveyed in the first direction contacts, the first print medium having the first side that has been printed; and a determination unit configured to determine a predetermined time for which the control unit keeps the second print medium on standby at the first position, wherein the region includes a first region located downstream of the printing unit with respect to the first direction and a second region located upstream with respect to the first direction and the acquisition unit acquires the application amount in the first region and the application amount in the second region, and wherein in a case of starting printing on the first side of the second print medium, in accordance with an application amount acquired by the acquisition unit, the determination unit determines the predetermined time.

2. The printing apparatus according to claim 1, wherein the second print medium is controlled to be conveyed in the first direction by the control unit while contacting the first print medium conveyed in the second direction, after having been printed on the first side, on a downstream side of the printing unit with respect to the first direction.

3. The printing apparatus according to claim 1, wherein the control unit further controls the feeding unit so as to feed the second print medium to the first position during printing on the first side of the first print medium.

4. The printing apparatus according to claim 1, wherein the determination unit:

determines the predetermined time in accordance with the application amount in the first region in a case where the application amount in the first region exceeds a first threshold value, determines the predetermined time in accordance with the application amount in the second region in a case where the application amount in the first region is equal to or lower than the first threshold value and where the application amount in the second region exceeds a second threshold value, and determines the predetermined time to be “0” in a case where the application amount in the first region is equal to or lower than the first threshold value and where the application amount in the second region is equal to or lower than the second threshold value.

5. The printing apparatus according to claim 4, wherein the control unit keeps the first print medium on standby in a second position where the first print medium reaches the second junction in the reversal conveyance path and executes printing on the second side of the first print medium after printing on the first side of the second print medium.

6. The printing apparatus according to claim 5, wherein in a case where a relationship between time t1 from a start of printing without keeping the second print medium on standby in the first position until the first print medium reaches the second position in the reversal conveyance path and time t2 required for the second print medium to reach the first junction from the first position is t2≤t1, the predetermined time determined in accordance with the application amount in the second region is set to a value greater than an absolute value of a difference between the time tl and the time t2 by a predetermined value, and in a case where the relationship is t2>t1, the predetermined time is set to “0”.

7. The printing apparatus according to claim 4, wherein the predetermined time according to the application amount in the first region is greater than time according to the application amount in the second region.

8. The printing apparatus according to claim 4, wherein the predetermined time according to the application amount in the first region and the predetermined time according to the application amount in the second region are each fixed values.

9. The printing apparatus according to claim 4, wherein the predetermined time according to the application amount in the first region varies in accordance with the application amount in the first region, and the predetermined time according to the application amount in the second region varies in accordance with the application amount in the second region.

10. The printing apparatus according to claim 1, wherein the first junction further includes a flapper displaceable between a first position where a print medium can be conveyed in the first direction in the conveyance path and a second position where a print medium conveyed in the second direction is guided to the reversal conveyance path.

11. The printing apparatus according to claim 10, further comprising:

a discharging path for discharging a print medium, wherein in a case where the flapper is located in the second position, the print medium conveyed in the first direction is guided to the discharging path, and the print medium conveyed in the second direction is guided to the reversal conveyance path.

12. A method of controlling a printing apparatus comprising:

a feeding unit configured to feed a print medium to a first position;

a conveyance unit configured to convey, in a first direction, the print medium fed to the first position by the feeding unit;

a printing unit configured to perform printing by applying ink to the print medium conveyed in the first direction by the conveyance unit;

a reversal conveyance path configured to reverse the print medium to be conveyed in a second direction opposite to the first direction after printing using the printing unit, the reversal conveyance path meeting a conveyance path for a print medium conveyed in the first direction at a first junction on a downstream side of the printing unit with respect to the first direction and a second junction on an upstream side of the printing unit with respect to the first direction, wherein printing is executed on a first side and a second side opposite to the first side of a first print medium and a second print medium subsequent to the first print medium an acquisition unit configured to acquire an application amount of the ink applied to a region of the first print medium conveyed through the reversal conveyance path that the second print medium being conveyed in the first direction contacts, the first print medium having the first side that has been printed; and a determination unit configured to determine a predetermined time for which the control unit keeps the second print medium on standby at the first position, wherein the region includes a first region located downstream of the printing unit with respect to the first direction and a second region located upstream with respect to the first direction and the acquisition unit acquires the application amount in the first region and the application amount in the second region, and wherein in a case of starting printing on the first side of the second print medium, in accordance with an application amount acquired by the acquisition unit, the determination unit determines the predetermined time.

* * * * *